(12) United States Patent
Benavides

(10) Patent No.: US 10,179,742 B2
(45) Date of Patent: Jan. 15, 2019

(54) FLUID INJECTION FILTRATION SYSTEM

(71) Applicant: Big Sky Automation, LLC, Plano, TX (US)

(72) Inventor: Eric Benavides, Fairview, TX (US)

( * ) Notice: Subject to any disclaimer, the term of this patent is extended or adjusted under 35 U.S.C. 154(b) by 748 days.

(21) Appl. No.: 14/619,695

(22) Filed: Feb. 11, 2015

(65) Prior Publication Data

US 2015/0218010 A1 Aug. 6, 2015

Related U.S. Application Data

(63) Continuation-in-part of application No. 13/961,876, filed on Aug. 7, 2013, now abandoned.

(51) Int. Cl.

| C02F 1/00 | (2006.01) |
| B01D 29/60 | (2006.01) |
| G06Q 10/08 | (2012.01) |
| C02F 101/32 | (2006.01) |
| C02F 103/10 | (2006.01) |

(52) U.S. Cl.
CPC ............ *C02F 1/001* (2013.01); *B01D 29/606* (2013.01); *G06Q 10/087* (2013.01); *G06Q 10/0832* (2013.01); *C02F 2101/32* (2013.01); *C02F 2103/10* (2013.01); *C02F 2209/03* (2013.01)

(58) Field of Classification Search
None
See application file for complete search history.

(56) References Cited

U.S. PATENT DOCUMENTS

| 3,650,283 A | 3/1972 | Lang |
| 3,744,633 A | 7/1973 | Schmidt, Jr. et al. |
| 3,831,761 A | 8/1974 | Chantereau |
| 3,880,237 A | 4/1975 | Snavely, Jr. et al. |
| 3,939,659 A | 2/1976 | Matthews |
| 3,998,735 A | 12/1976 | Nathan |
| 4,039,452 A | 8/1977 | Fernandez |
| 4,104,164 A | 8/1978 | Chelton |
| 4,349,434 A | 9/1982 | Jaworski |
| 4,482,459 A | 11/1984 | Shiver |
| 4,515,607 A | 5/1985 | Wolde-Michael |
| 4,689,153 A | 8/1987 | Follmann et al. |

(Continued)

FOREIGN PATENT DOCUMENTS

| WO | 2015021241 A1 | 2/2012 |
| WO | 2012026827 A1 | 3/2012 |

OTHER PUBLICATIONS

Benavides, Eric, Patent Application entitled "Fluid Injection Filtration System," filed Aug. 7, 2014, PCT Application No. PCT/US14/50078.

(Continued)

*Primary Examiner* — Richard C Gurtowski

(57) ABSTRACT

A method of filtering fluid for injection into an injection well comprises detecting a fluid pressure in a conduit upstream of an actuator valve, verifying that the fluid pressure is within an operating pressure range, opening an actuator valve based on the verifying, receiving a fluid having suspended solids within a filter assembly in response to opening the actuator valve, actuating a pump in fluid communication with the filter assembly based on receiving the fluid within the filter assembly, and separating at least a portion of the suspended solids in the fluid within the filter assembly.

13 Claims, 8 Drawing Sheets

(56) References Cited

U.S. PATENT DOCUMENTS

| | | | |
|---|---|---|---|
| 4,793,938 | A | 12/1988 | Dayton |
| 5,032,293 | A | 7/1991 | Tuite |
| 5,047,123 | A | 9/1991 | Arvanitakis |
| 5,069,783 | A | 12/1991 | Wang et al. |
| 5,252,224 | A | 10/1993 | Modell et al. |
| 5,456,097 | A * | 10/1995 | Zakhary ............... B21D 22/201 210/805 |
| 5,597,042 | A | 1/1997 | Tubel et al. |
| 5,626,751 | A | 5/1997 | Kikuchi et al. |
| 5,783,245 | A | 7/1998 | Simpson, II |
| 6,123,174 | A | 9/2000 | Elkin et al. |
| 6,257,332 | B1 | 7/2001 | Vidrine et al. |
| 6,325,932 | B1 | 12/2001 | Gibson |
| 6,638,422 | B1 | 10/2003 | Schwartzkopf |
| 7,510,656 | B2 | 3/2009 | Shafer et al. |
| 8,158,010 | B2 | 4/2012 | Pearse et al. |
| 8,323,506 | B2 | 12/2012 | Gannon |
| 9,732,603 | B2 | 8/2017 | Benavides |
| 2005/0139530 | A1 | 6/2005 | Heiss |
| 2007/0023193 | A1 | 2/2007 | King |
| 2007/0090039 | A1 | 4/2007 | Young et al. |
| 2008/0053896 | A1 | 3/2008 | Shafer et al. |
| 2010/0218946 | A1 | 9/2010 | Symington et al. |
| 2011/0046787 | A1 | 2/2011 | Booth |
| 2012/0181028 | A1 | 7/2012 | Daussin et al. |
| 2012/0259722 | A1 * | 10/2012 | Mikurak ............... G06Q 10/087 705/26.1 |
| 2013/0087502 | A1 | 4/2013 | Blumer et al. |
| 2015/0041408 | A1 | 2/2015 | Benavides |
| 2015/0041413 | A1 | 2/2015 | Benavides |
| 2015/0041416 | A1 | 2/2015 | Benavides |

OTHER PUBLICATIONS

Foreign Communication from a Related Counterpart, International Search Report and Written Opinion, dated Dec. 2, 2013, PCT/US14/50078, filed on Aug. 7, 2014.

Restriction Requirement—dated Oct. 22, 2013, U.S. Appl. No. 13/961,876, filed Aug. 7, 2014.

Office Action dated Feb. 12, 2014, U.S. Appl. No. 13/961,876, filed Aug. 7, 2014.

Final Office Action dated Jul. 18, 2014, U.S. Appl. No. 13/961,876, filed Aug. 7, 2014.

Advisory Action dated Jul. 18, 2014, U.S. Appl. No. 13/961,876, filed Aug. 7, 2014.

Office Action dated Mar. 16, 2015, U.S. Appl. No. 13/961,876, filed Aug. 7, 2014.

Foreign Communication from a Related Counterpart, International Preliminary Report on Patentability, dated Feb. 18, 2016, PCT/US14/50078, filed on Aug. 7, 2014.

Restriction Requirement—dated Apr. 25, 2016, U.S. Appl. No. 14/318,194, filed Jun. 27, 2014.

Office Action dated Jul. 11, 2016, U.S. Appl. No. 14/318,194, filed Jun. 27, 2014.

Final Office Action dated Jan. 18, 2017, U.S. Appl. No. 14/318,194, filed Jun. 27, 2014.

Notice of Allowance and Fee(s) Due dated Jul. 13, 2017, U.S. Appl. No. 14/318,194, filed Jun. 27, 2014.

Office Action dated Jan. 27, 2017, U.S. Appl. No. 14/318,205, filed Jun. 27, 2014.

Final Office Action dated Jun. 20, 2017, U.S. Appl. No. 14/318,205, filed Jun. 27, 2014.

Advisory Action dated Oct. 24, 2017, U.S. Appl. No. 14/318,205, filed Jun. 27, 2014.

Notice of Allowance dated Sep. 7, 2018, U.S. Appl. No. 14/318,205, filed Jun. 27, 2014.

* cited by examiner

FLUID INJECTION FILTRATION SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the production of hydrocarbons, water is often produced along with the hydrocarbons. The water may result from various sources including naturally occurring water within a subterranean formation and/or water recovered after it is injected into the formation as part of a treatment procedure (e.g., formation stimulation, water or steam flooding, etc.). The water recovered from the subterranean formation may be reinjected into the same or a different subterranean formation in order to dispose of the water in a safe and efficient manner. Often, dedicated injection wellbores may be used for injecting the recovered water, though repurposed or converted wells may also be used for injection purposes.

The water that is to be injected into an injection well often contains impurities. For example, the water may contain salts, various chemicals present in the oilfield industry, suspended solids, and the like. The presence of the solids can detrimentally affect the injection well by plugging the pores in the injection formation, thereby damaging the injection wellbore and limiting the ability to inject fluids in the future.

SUMMARY

In an embodiment, a method of filtering fluid for injection into an injection well comprises detecting a fluid pressure in a conduit upstream of an actuator valve, verifying that the fluid pressure is within an operating pressure range, opening an actuator valve based on the verifying, receiving a fluid having suspended solids within a filter assembly in response to opening the actuator valve, actuating a pump in fluid communication with the filter assembly based on receiving the fluid within the filter assembly, and separating at least a portion of the suspended solids in the fluid within the filter assembly.

In an embodiment, a fluid injection filtration system, the system comprises a filter assembly configured to receive a fluid comprising suspended solids and separate at least a portion of the suspended solids from the fluid, wherein the fluid comprises an aqueous fluid portion, a hydrocarbon fluid portion, and the suspended solids, an actuator valve in fluid communication with the filter assembly that is configured to selectively control fluid flow through the filter assembly, and a pump in fluid communication with the filter assembly. The pump is configured to receive the fluid comprising at least the aqueous fluid portion and the hydrocarbon fluid portion, and the pump is configured to avoid substantially homogenizing the fluid.

In an embodiment, a method of filtering fluid for injection into an injection well comprises receiving a fluid within a filter assembly, wherein the fluid comprises an aqueous fluid, a hydrocarbon fluid, and suspended solids, passing the fluid through the filter assembly, separating at least a portion of the suspended solids in the fluid within the filter assembly as the fluid passes through the filter assembly, ceasing separation of the suspended solids from the fluid, washing at least the portion of the separated suspended solids from the filter assembly into a solids collection vessel, separating the aqueous fluid and the hydrocarbon fluid from the portion of the solids in the solids collection vessel, and recycling at least the hydrocarbon fluid from the solids collection vessel to an inlet of the filter assembly. At least a portion of the aqueous fluid and the hydrocarbon fluid pass into the solids collection vessel with the separated suspended solids.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
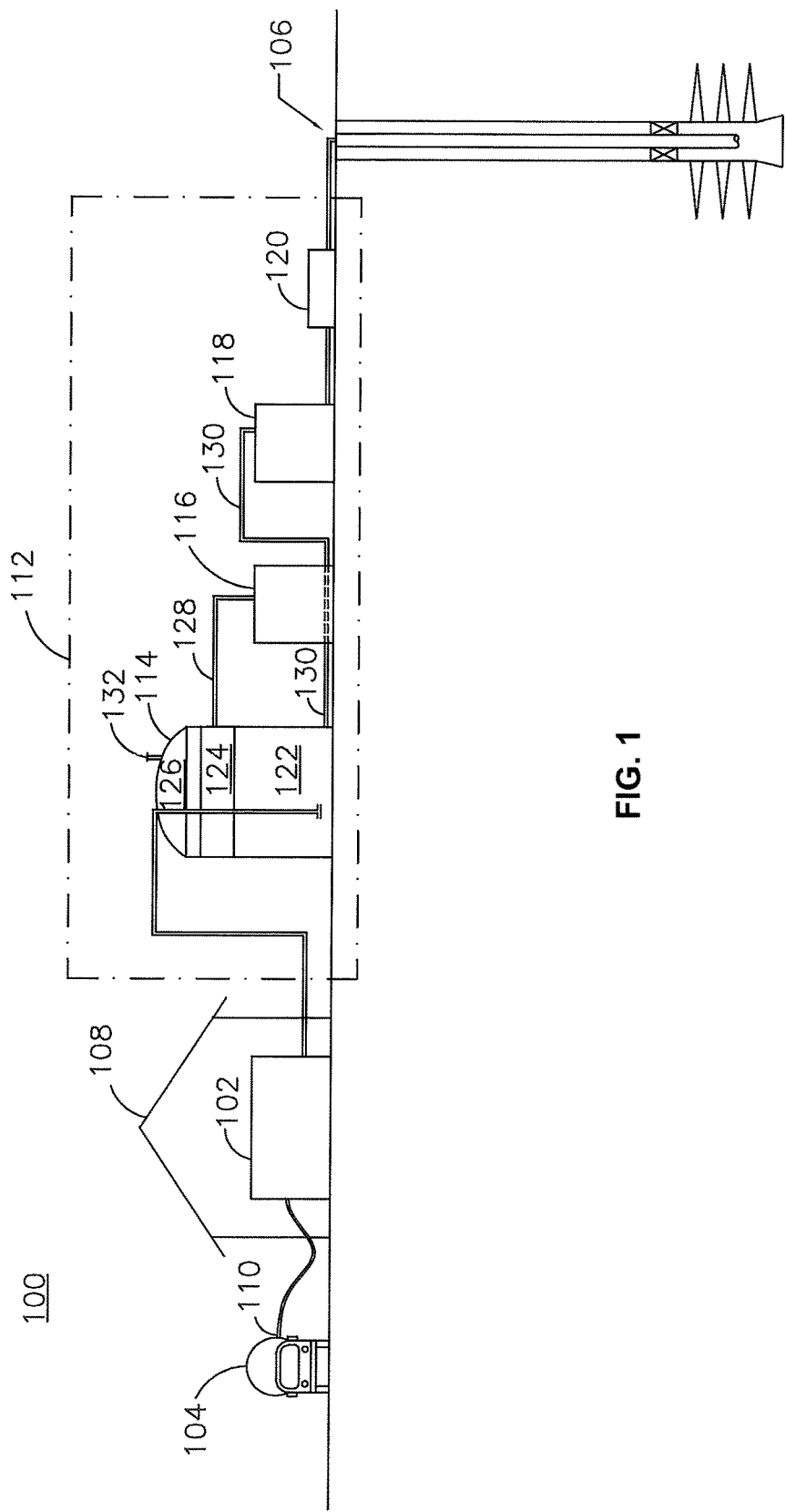
FIG. 1 illustrates a schematic representation of a fluid injection system according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed infra may be employed separately or in any suitable combination to produce desired results.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ".

The fluids (e.g., aqueous fluids) produced during the production of hydrocarbons can comprise various impurities such as solids. Solids, often suspended in the fluid, can result from a number of sources including formation fines (e.g., clays, sand, silt, etc.) coming from the formation itself, precipitates, scales, organic solids, gels, and various solids resulting from injected chemicals and treatment equipment. When the solids are injected into a well, the solids can travel into the pores of the formation, potentially clogging and inhibiting further fluid flow into the formation. The degree to which the solids can plug the formation varies. When the porosity of a formation is affected by solids, a treatment procedure such as an acid injection can be used to attempt to remove or dissolve a portion of the solids. The composition of the solids can affect the amount to which a workover or treatment procedure can remediate any damage. While some remediation procedures are available, they are costly in terms of time and money to perform.

In order to avoid or limit the injection of the solids into the formation, a fluid injection system may comprise a filter apparatus or assembly configured to remove a portion of the solids. Various types of filters can be used such as removable and disposable filters. These filters are typically placed into service with a relatively short expected operating life. When the filters are filled, they can be removed and disposed of with the filtered solids inside. The use of the disposable filters can present several problems. For example, the disposable nature of the filters tends to drive their design towards inexpensive materials. These filters may be prone to failure if the operating pressure is exceeded. For example, a user may increase a pump pressure above the operating threshold of the filter, causing the filter to fail. When a filter fails, the trapped solids may be released for injection into the injection well. Moreover, the frequent replacement of the filters increases the chances that a filter is installed improperly, potentially leading to fluid bypassing the filter. Finally, the replaceable nature of the filter provides the opportunity for the filter to be bypassed by removing the filter and not reinstalling a new filter.

A system and method are provided herein for reducing the ability of a user to bypass the filter assembly in a fluid injection system. The fluid injection system generally comprises a filter assembly, an actuator valve, a pump, a plurality of sensors, and a control system. The control system accepts an input from a user and only actuates the actuator valve and pump when the user is authorized to use the system. The control system also accepts inputs from the sensors and may only activate the system when certain conditions are met. By controlling the actuator valve and pump, the control system can ensure that an unauthorized user cannot pump through the system into the injection well. Moreover, the use of a pump associated with the facility rather than the vehicle delivering the fluid may allow the control system to control the pressure within the filter assembly, thereby reducing or eliminating the occurrence of pressure induced failure of the filters. Additional sensors can be used to ensure that the filter is properly installed prior to actuating the system, thereby reducing or eliminating the occurrence of a user bypassing a filter. The use of the control system also allows the system to operate without an employee on site, which is to say that the control system may enable the facility to operate as an unmanned facility while maintaining the appropriate supervision of the fluid injection system. Overall, the fluid injection system may provide increased solids separation for fluids passing to an injection well.

As further described herein, the system may be provided as a stationary location or a portable facility for use in filtering fluids for injection into an injection well. In some instances, the system may be constructed at or near an injection well and serve as a permanent, built-in facility. Alternatively, the system may be constructed as a portable unit such as a skid mounted unit. The system may be constructed in one location and transported to a new or existing injection well. The system may then be connected to the injection well, a storage area, and/or an existing filtering facility. The ability to provide the system as a skid mounted unit may allow existing facilities to be upgraded with relatively minor modifications and downtime.

Also described herein is a filter assembly for use with the fluid injection system. The filter assembly comprises a housing defining a chamber, a filtration device disposed in the chamber and dividing the chamber into an inlet portion and an outlet portion, a fluid inlet that receives a fluid into the inlet portion of the chamber, a fluid outlet that receives the fluid after is passes through the filtration device and passes the fluid out of the housing, and a drain that allows any separated solids to be removed from the inlet portion of the chamber. The filtration device is configured to separate at least a portion of the solids from a fluid passing through the filtration device. The portion of the solids that are separated can be retained in the inlet portion of the housing, and the drain can then be used to remove the separated solids from the housing. The filter assembly can be used as the filter assembly within the filtration system described herein, and/or the filter assembly can be used as a portable device. When used as a portable device, the filter assembly may serve to filter produced water at a well site during a variety of wellbore drilling, installation, production, and servicing operations. For example, the filter assembly can be transported to a well site and used to pre-filter any produced water prior to the water being taken to an injection well for disposal.

In general, the filtration device can be reusable and can be cleaned within the filter assembly. The reusable nature of the filtration device can allow the filtration device to be constructed of stronger materials than the disposable filters. This construction may allow the filter assembly to be more robust than a filter having disposable filter elements and may provide a cost savings in avoiding constant replacement of the filter element. Further, the ability to clean the filtration device within the filter assembly limits the opportunities for the filtration device to be incorrectly installed or removed, which also reduces the chances that the filtration device could become damaged during installation. Thus, the filter assembly design provided herein may be more reliable than a filter system having disposable filters. When used with the fluid injection system described herein, the resulting system may provide a reliable and controlled fluid injection system that improves the filtering process for a fluid being sent to an injection well.

FIG. 1 schematically illustrates an embodiment of a fluid injection system 100. The system 100 generally comprises a filter assembly 102 that receives a fluid to be injected. The fluid may be received from various sources such as a pipeline and/or a vessel 104. The vessel 104 may be part of a truck (e.g., a vacuum truck) or other vehicle used to transport fluid for disposal to the injection well 106. In some embodiments, the filter assembly 102 may be located within a building or roofed structure 108. The fluid may pass from the filter assembly 102 to a storage section 112 comprising one or more separators 114 and storage tanks 116, 118, which may serve to store any separated hydrocarbons and the filtered water for injection. A high pressure pump 120 may serve to inject the filtered and accumulated water within the storage tanks 118 into the injection well 106.

The fluid received at the fluid injection system 100 may comprise various components. In general, the fluid may comprise water, hydrocarbons, and solids. In some embodiments, additional chemicals used in subterranean wellbores may be present in the fluid such as gels, surfactants, acids, solvents, and any other treatment chemicals commonly found in the hydrocarbon production industry. The fluid can be received from a wellbore and may have varying amounts of the hydrocarbons and solids combined with the aqueous phase. During transportation to the injection wellsite, the fluid may separate to some degree. For example, any heavy solids may sink to the bottom of a vessel containing the fluid, and any hydrocarbons or light solid components may rise to the top of the vessel. Various emulsions may separate into levels according to their relative buoyancies. During removal of the fluid from the vessel, the fluid passing through the filter assembly 102 may change during the offload process. For example, the first fluid received from the vessel may generally comprise the heavy solids followed by a predominately aqueous phase, and ending with a hydrocarbon phase, if present. In some embodiments, the fluid may remain relatively uniform in composition during the filtration process.

The fluid injection system 100 may generally be used to receive and filter a fluid prior to injection into the injection well 106. In general, the fluid to be injected may be delivered to the injection site in a vessel 104 associated with a truck or other transportation device. In some embodiments, a pipeline may deliver the fluid and be coupled directly to one or more fluid injection system 100 inlets. When the fluid is delivered in a vessel 104, the vessel 104 may be connected to the filter assembly 102 using various fluid conduits 110 (e.g., hoses). These conduits 110 can be supplied with the vehicle, but as described in more detail herein, the conduits 110 may be supplied by the operator of the facility to ensure they are properly maintained.

Once connected to the filter assembly 102, the fluid may be transferred from the vessel 104 to the injection well 106 through the filter assembly 102. In some embodiments, a pump associated with the vessel 104 and/or vehicle may be used to transfer the fluid from the vessel 104 through the filter assembly 102. For example, a pump may be located on the vehicle and be connected to the vessel 104. The conduits 110 may then be connected to the outlet of the pump so that when the pump is turned on, the pump transfers fluid from the vessel 104 to the filter assembly 102. In other embodiments, a pump may be associated with the system 100. For example, a pump may be coupled into the system downstream of the filter assembly 102 (e.g., between the filter assembly 102 and the injection well 106) and used to draw fluid into the filter assembly 102 from the vessel 104. In an embodiment, a pump may not be needed when the fluid is supplied through a pipeline. In this embodiment, the fluid pressure may be supplied by one or more upstream components associated with the pipeline.

As the fluid flows through the filter assembly 102, at least a portion of any suspended solids within the fluid may be separated. The filtered fluid may pass through the filter assembly 102 for downstream injection in the injection well 106. The filtered fluid may comprise the fluid entering the filter assembly 102 having the portion of the suspended solids removed, and the filtered fluid may comprise any aqueous and/or hydrocarbon components entering with the fluid. The filtered solids may then be removed from the filter assembly 102 for disposal. As described in more detail below, various types of filters and filtration devices may be used to separate the portion of the suspended solids from the fluid as the fluid passes through the filter assembly 102.

After passing through the filter assembly 102, the fluid may pass to a storage section 112. In general, the fluid passing through the filter assembly 102 may comprise hydrocarbons such as produced oil. A separator 114 such as a settling tank (e.g., a gunbarrel settling tank, etc.), heater treater, free water knockout, vortex tube separator, and the like may receive the fluid from the filter assembly 102 and separate the fluid into two or more phases when hydrocarbons are present in the water. The fluid may be separated into a water phase 122, a hydrocarbon phase 124, and a gas phase 126. The hydrocarbon phase 124 may exit through line 128 and pass to a hydrocarbon storage tank 116. While only one hydrocarbon storage tank 116 is illustrated in FIG. 1, a plurality of hydrocarbon storage tanks 116 may be present to meet the storage requirements of the separated hydrocarbon phase 124. The hydrocarbon phase in the hydrocarbon storage tanks 116 may be periodically transferred for sale or other use to a pipeline or transport vehicle. The gas phase 126 may comprise one or more inert gases (e.g., air entrained in the filtration system) and/or gases evolved from the hydrocarbon phase 124. The gas phase 126 can be vented through line 132 to the atmosphere, vented to a flare, and/or gas balanced to the storage tanks 116. The separated water phase 122 may be passed downstream for injection into the injection well 106. Initially, the separated water phase 122 may exit the separator 114 through line 130 and pass to an injection water storage tank 118. The injection water storage tank 118 may retain and accumulate the filtered water until a predetermined level is reached. At this time, a high pressure pump 120 may be activated to pressure the filtered water and inject it into the injection well 106. When the water level within the injection water storage tank 118 drops below a predetermined level, the pump 120 may shut off and allow the filtered water to accumulate in the injection water storage tank 118. While only one injection water storage tank 118 is illustrated in FIG. 1, any number of injection water storage tanks 118 may be present to meet the storage requirements of the separated water phase 122. Thus, the storage section 112 may serve to receive the filtered fluid, separate the fluid into one or more components, and inject the water into the injection well 106.

Various facilities operating as fluid injection systems 100 may be either manned or unmanned. Manned facilities have one or more personnel at the site that are associated with the fluid injection system 100. The personnel may inspect the fluid arriving in the vessels 104 on the vehicles and assist with connecting the vessels 104 to the filter system 102 using fluid conduits 110 (e.g., hoses) that are usually supplied by the vehicle. The personnel may be responsible for ensuring that the system 100 operates as intended and can correct various issues that may arise. An unmanned facility may rely on a driver or other user associated with the vehicle to operate the fluid injection system 100 while not having any personnel associated with the system 100 present. If any problems arise during the use of the system 100, the user may be responsible for correcting any issues on their own. In general, a user may not be trained, may not be capable of, or may purposely choose to circumvent one or more features of the system 100. For example, when the filter system comprises a filter sock, a user may choose to remove the filter sock within the filter assembly and/or use a pump pressure so high that the filter sock fails, thereby passing suspended solids through the filter assembly and into the injection well 106. When implemented at a manned facility, the fluid injection system described herein may allow a manned facility to be converted into an unmanned facility. For example, the additional level of control and oversight provided by the fluid injection systems and filter assemblies described herein may allow for operation of the facility without any personnel associated with an injection well location being present. While personnel may be called to the facility for various reasons (e.g., maintenance issues, repairs, etc.) and/or remotely monitor the filtration process, the absence of the personnel at the injection well location during the general operation of the system may be referred to as operating an "unmanned facility."

Figure 2:
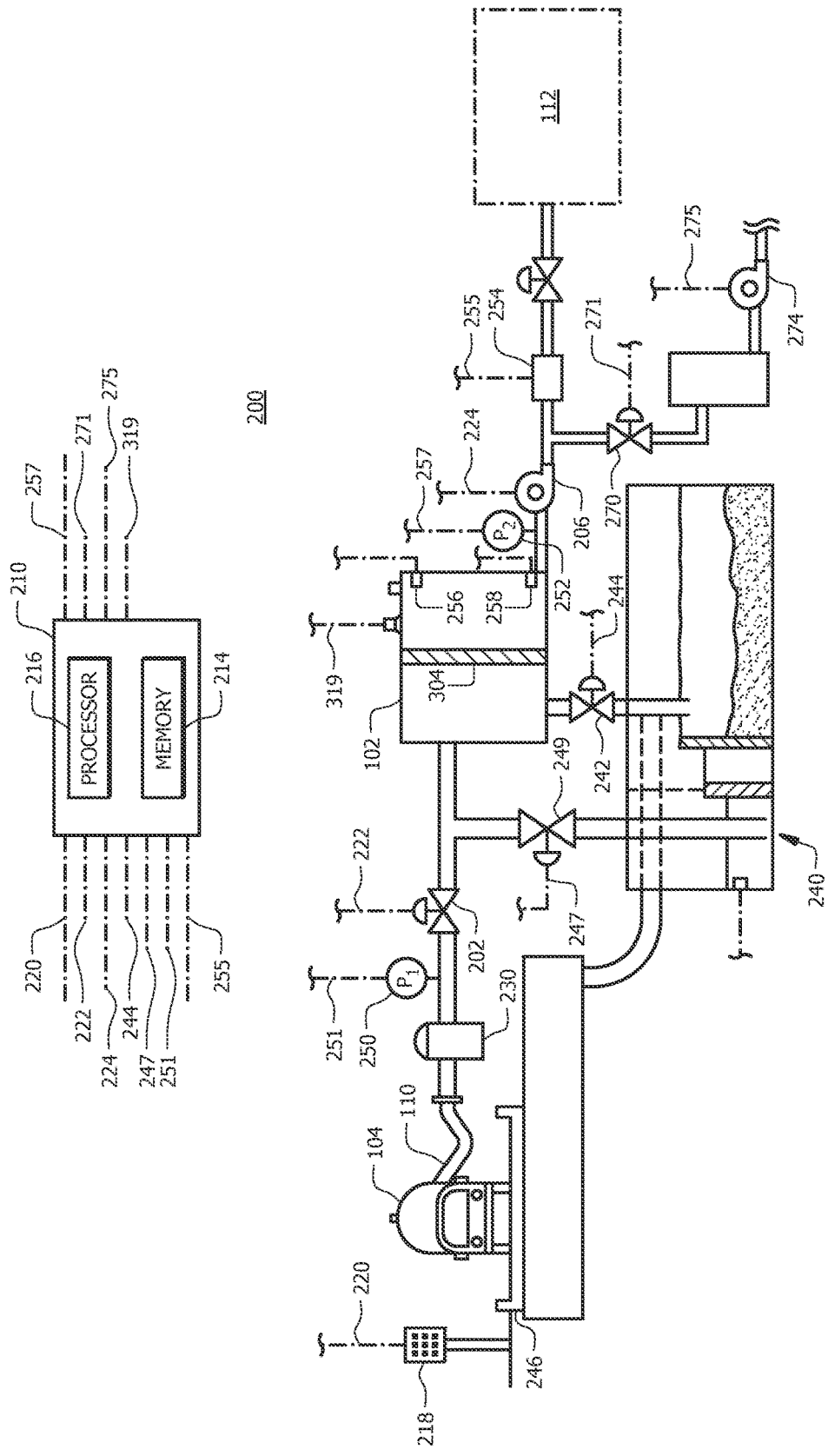
FIG. 2 illustrates a schematic representation of another fluid injection system according to an embodiment.

FIG. 2 illustrates a fluid injection system 200 similar to the system 100 described above. In some embodiments, the system 200 may comprise a filter system designed to prevent the circumvention of the filter system. The system 200 generally comprises a filter assembly 102 configured to receive a fluid comprising suspended solids from a fluid source, such as the vessel 104. An actuator valve 202 may be in fluid communication with the filter assembly 102. As shown in FIG. 2, the actuator valve 202 can be disposed in a fluid line 204 upstream from the filter assembly 102 and/or the actuator valve 202 can be disposed in a fluid line downstream of the filter assembly 102. A pump 206 may also be disposed in the fluid line 204 either upstream or downstream from the actuator valve 202. The fluid passing through the fluid injection system 200 may pass to a storage section 112 that may be substantially the same as or similar to the storage section 112 described with respect to FIG. 1.

As shown in FIG. 2, the filter assembly 102 may generally comprise any device configured to remove at least a portion of any suspended solids in a fluid. As described in more detail below, the filter assembly 102 may comprise a filtration device formed from a screen. The screen may extend across the interior of the filter assembly housing or be formed in the shape of a cylinder within the housing. In some embodiments, the filter assembly 102 may comprise replaceable and/or disposable filtration devices such as filter tubes or filter socks. While replaceable filtration devices may provide suitable filtering and separation capabilities, they can fail if not properly installed and typically require an additional expense for disposal upon being replaced. In some instances, the solids separated and retained in the replaceable filtration devices may contain naturally occurring radioactive materials (NORM) that make the replaceable filtration devices unsuitable for handling, further complicating their removal and disposal. The design of an embodiment of the filter assembly is described in more detail herein with respect to FIGS. 4 and 5.

The actuator valve 202 is configured to selectively control fluid flow through the filter assembly 102. The actuator valve 202 comprises an inlet, an outlet, and a control means for providing selective fluid communication between the inlet and outlet. In some embodiments, the actuator valve 202 may be manually operated. Various types of actuator valves may be used. For example, the actuator valve 202 may include, but is not limited to, a gate valve, a ball valve, a plug valve, a globe valve, a butterfly valve or the like. When used with the control system 212, the actuator valve 202 may be automatically controlled to actuate to an open position, a closed position, or any position in between an open and closed position in response to an input signal from the controller 212. Various types of valve controls are generally known and are suitable for use with the actuator valve 202 describe herein. For example, the actuator valve 202 may be controlled by a pneumatic controller, a hydraulic controller, an electro-mechanical controller (e.g., a solenoid, motor, etc.), and the like. The actuator valve 202 may be sized to accommodate an expected or desired flow rate through the system 200 for injection into the injection well 106. While illustrated in FIG. 2 as being disposed upstream of the filter assembly 102 and therefore controlling fluid flow into the filter assembly 102, the actuator valve 202 can also be disposed in a fluid line downstream of the filter assembly 102 and thereby controlling fluid flow out of the filter assembly 102. In some embodiments, multiple actuator valves 202 can be disposed upstream and/or downstream of the filter assembly 102.

The pump 206 is configured to draw fluid from the vessel 104 into the filter assembly 102. The pump 206 can comprise any suitable type of pump known for receiving a fluid, increasing the pressure, and output the fluid to a downstream source. For example, the pump 206 may comprise a centrifugal pump, a positive displacement pump, a screw pump, or any other suitable pump. Due to the discontinuous nature of the fluid flow from vessels transported by vehicles, the pump 206 may be configured to handle both liquids and gases to some degree, though in some embodiments, sensors may be used to ensure that the pump maintains a sufficient fluid head to prime the pump for each use. In an embodiment, the pump 206 is disposed downstream of the filter assembly 102 between the filter assembly 102 and the injection well 106. The pump 206 may be disposed either upstream or downstream of the actuator valve 202. By locating the pump 206 downstream of the filter assembly 102, the fluid may be pulled into the filter assembly 102, thereby limiting the pressure within the filter assembly 102 and potentially preventing or limiting an overpressure condition within the filter assembly 102. The pump 206 is configured to draw fluid into the filter assembly 102 and pass the fluid to the storage section 112 and can be sized (e.g., flowrate, horsepower, etc.) accordingly. In some embodiments, the system 200 may comprise an actuator valve 202 or a pump 206, but not necessarily both. In some embodiments, the pump 206 can be disposed upstream of the filter assembly 102 and pump fluid into the filter assembly 102. A pressure sensor associated with the system (e.g., with the pump, the fluid conduit, the filter assembly 102, etc.) may be used to avoid over-pressuring the filter assembly 102 when the pump 206 is disposed upstream of the filter assembly 102.

In an embodiment, the pump 206 may be a constant speed pump or a variable speed pump. The use of a variable speed pump may allow the flow rate of the fluid through the filter assembly 102 to be controlled based on the flow rate of the fluid being received into the system. For example, as the fluid flow rate into the fluid inlet is reduced (e.g., as the fluid level is dropping within a vessel 104), a variable speed or variable flow rate pump may be able to reduce the flow rate through the pump 206 to match the flow rate into the system 200. Further, the flow rate through the filter assembly 102 may be reduced as the filter element within the filter assembly becomes clogged and the pressure drop through the filter element increases. The reduced fluid flow rate may avoid the creation of a pressure differential across the filter element that can damage the filter element or cause the filter element to fail. The reduced flow rate may further prevent the fluid level from dropping in the outlet portion of the filter assembly 102 and thereby running the pump 206 dry.

In some embodiments, the pump 206 can be configured to move fluid without inducing mixing or substantially homogenizing the fluid. Various types of pumps may move the fluid by translating discrete volumes of the fluid without significantly shearing the fluid to create a mixing or homogenizing effect. In some embodiments, screw pumps may utilize one or more rotating screws within corresponding cylindrical cavities to move the fluid along the screw's axis. When used with the fluid comprising an aqueous fluid and a hydrocarbon, the screw pump may be useful in reducing or avoiding homogenization of the fluid as it passes through the pump. This may maintain the fluid in a multi-phase state as it passes through the pump 206. A fluid may be characterized as being substantially homogenized if the fluid viscosity increases by at least about 10%, at least about 20%, at least about 30%, at least about 40%, or at least about 50% when passing through the pump 206. Any emulsions passing through the pump 206 may also avoid becoming increasingly homogenized. When combined with a variable speed drive, the pump 206 may be configured to avoid or limit any homogenization of the fluid passing through the pump 206. The fluid may be capable of being more easily, and more completely, separated in the downstream storage section 112, thereby allowing for a greater recovery of any hydrocarbons in the fluid.

Various sensors may be used with the system 200 to allow for a controlled operation of the system 200 including, one or more pressure sensors, flow meters, level sensors, temperature sensors, and the like. The pressure sensors 250, 252 may be located upstream and/or downstream of the filter assembly 102. The inlet pressure sensor 250 may be located upstream of the actuator valve 202 to sense an inlet fluid pressure when the actuator valve 202 is closed. The inlet pressure sensor 250 may comprise any type of pressure sensor suitable for measuring a pressure within the inlet fluid line such as piezoresistive strain meters, capacitive meters, electromagnetic sensors, piezoelectric meters, optical sensors, potentiometric sensors, or the like. In general, the pressure within the inlet line may detect the hydrostatic head associated with a fluid within a vessel 104, providing an expected pressure range of between about 0.5 pounds per square inch gauge (psig) to about 30 psig. Higher pressures may be expected if the fluid is supplied by a pressurized source such as a pipeline or a pressurized tank. When the fluid is supplied through a higher pressure source such as a pipeline, a pressure regulator or other pressure reduction device may be used to maintain the inlet pressure to the system 200 in a range suitable for use with the filter assembly 102. When the actuator valve 202 is opened, the pressure sensor 250 may be in fluid communication with the inlet of the filter assembly 102 to provide an indication of the inlet pressure within the filter assembly 102. While illustrated as being upstream of the actuator valve 202, the inlet pressure sensor 250 may be located downstream of the actuator valve 202 and detect the pressure within at least an inlet portion of the filter assembly 102. In an embodiment, the inlet pressure sensor 250 may be in signal communication with the control system 210 through communication link 251, which may comprise any of the types of communication links described herein.

The outlet pressure sensor 252 may be located downstream of the filter assembly 102. The outlet pressure sensor 252 may be in fluid communication with the filter assembly 102 to allow a pressure within at least an outlet portion of the filter assembly 102 to be determined. In an embodiment, the outlet pressure sensor 252 can be located upstream of the pump 206. The outlet pressure sensor 252 may comprise any type of pressure sensor suitable for measuring a pressure within the filter assembly 102 and/or a downstream line including any of those described with respect to the inlet pressure sensor 250. In an embodiment, the outlet pressure sensor 252 may be in signal communication with the control system 210 through communication link 257, which may comprise any of the types of communication links described herein.

In an embodiment, a flow meter 254 may be located downstream of the filter assembly 102 to provide an indication of the amount of fluid flow passing out of the filter assembly 102. The flow meter 254 may be located upstream or downstream of the pump 206 and/or the outlet pressure sensor 252. The flow meter 254 can be configured to determine the volume and/or mass of fluid passing through a fluid line. In an embodiment, the flow meter 254 may be in signal communication with the control system 210 through communication link 255, which may comprise any of the types of communication links described herein. Any suitable type of flow meter can be used to measure the fluid flow through the filter assembly 102 including, but not limited to, mechanical flow meters, pressure based flow meters, optical flow meters, vortex flow meters, electromagnetic flow meters (e.g., magnetic flow meters, etc.), ultrasonic flow meters, Coriolis flow meters, laser Doppler flow meters, and the like. Various additional sensors such as temperature and pressure sensors may also be included with the flow meters in order to properly determine the fluid flow through the flow meter 254. In an embodiment, a plurality of flow meters 254 may be used in combination to determine the flow rates of various components through the system. In an embodiment, a first flow meter may determine a total fluid volume passing through the system, and a second flow meter may determine a flow rate of the aqueous and/or hydrocarbon phase. For example, a magnetic flow meter may be used to determine the flow rate of the aqueous phase. A comparison with the total fluid flow rate may allow for a determination of the total fluid flow rate, an aqueous phase flow rate, and/or a hydrocarbon phase flow rate. The flow rates of the one or more components may be used with the control system described below to operate the system. In order to ensure that the fluid is passed through the filter assembly 102 to remove the suspended solids from the fluid, a control system 210 may be implemented. The control system 210, which may be implemented in some contexts on a computer, may generally comprise a controller 212 comprising a memory 214 and a processor 216. The memory 214 may comprise a control program configured to operate on the processor 216. The control program may be suitable for controlling various portions of the system 200. The control program may ensure that only authorized users have access to the system 200 and that the system functions as intended. In some embodiments, the control program may ensure that the fluid is only being supplied through hydrostatic pressure and that the source is not forcing fluid through the filter assembly. The control system 210 (e.g., through the execution of the control program) may also ensure that the system operates within suitable operating parameters. The memory 214, the processor 216, and various other portions of a control system 210 suitable for implementing a control program are described in more detail below.

The controller 212 may be in signal communication with an input device 218 configured to accept an input from a user of the system 200 using a communication link 220. In an embodiment, the input may comprise an identification used to authenticate the user and allow access to the system 200. The input can comprise any type of identification such as a key code, a Personal Identification Number (PIN), a company identification number, an authorization code, various biometric indicators, or the like. The input device 218 may comprise a variety of devices based on the type of input used. For example, the input device may comprise an electronic device including, but not limited to, a key pad, a touch pad, a computer interface, a biometric sensor, and the like.

The controller can be in signal communication with the input device 218 over communication link 220, the actuator valve 202 over communication link 222, the pump 206 over communication link 224, the sensors (e.g., the pressure sensors 250, 252, the flow meter 254, one or more level sensors, etc.) over respective communication links, and/or one or more components within the storage section 112 (e.g., one or more level sensors, temperature sensors, pressure sensors, the high pressure pump, etc.) over communication link 226. The communication links can comprise any type of link or communication media suitable for transferring a signal from the control system 210 to the respective device. In some embodiments, the communication links 220, 222, 224, 226 may include various types of direct communication media. For example, the input device 218 may be hard wired to the controller 212 over an electrical conductor. Other suitable direct communication media can include fiber optic cables, pneumatic lines, hydraulic lines, and the like. For example, the communication link 222 between the controller 212 and the actuator valve 202 may comprise a pneumatic control line for actuating the actuator valve 202, which may be a pneumatically controlled valve. In some embodiments, one or more of the communication links 220, 222, 224, 226 may comprise wireless communication links. For example, one or more types of wireless communication such as WiFi, BlueTooth, cellular communication channels, and the like may be used to establish a connection between the various components of the system and the controller 212 suitable for transferring data and commands. The various components (e.g., the input device 218, the actuator valve 202, the pump 206, components within the storage section 112, etc.) may comprise suitable communication equipment (e.g., receivers, transceivers, modems, sensors, electromechanical converts, etc.) for sending, receiving, and carrying out communications over the communication links 220, 222, 224, 226.

The control program can be stored in the memory 214 and executed by the processor 216 to configure the processor 216 to detect one or more inputs and/or conditions associated with the system. For example, the control program may detect an input on the input device 218. In an embodiment, the input may comprise an identification. Any suitable identification may be used such as a personal identification number (PIN), a company code, a password, a biometric indicator (e.g., a fingerprint, retinal scan, etc.), or any other suitable identifier. In an embodiment, a driver delivering a vessel 104 containing a fluid for injection may transport the vessel 104 to the facility and enter the identification into the input device 218. The identification may be transmitted to the control system 210 over the communication link 220. The control program may then be configured to verify an authorization of the user (e.g., the driver) to use the fluid injection system 200 based on the input from the input device 218. The control program may compare the received input with a database of authorized users, and upon verifying a match, may authenticate the user for use of the fluid injection system 200. If the control program is unable to locate a match for the input, the control system may simply fail to respond or authenticate the user. In some embodiments, the control system 210 may return a message to the input device 218 indicating that the user input was invalid or not identifiable. For example, a message may be displayed to the user indicating that the input was not valid or that the user is not authorized to operate the fluid injection system 200.

The control program may detect one or more conditions within the system prior to and/or during operation. In an embodiment, the control program may detect a pressure within the system 200 prior to operation. When the inlet pressure sensor 250 is disposed upstream of the actuator valve 202, the pressure on the system can be detected. For example, the inlet pressure sensor 250 may provide an indication to the control program of the pressure on the system to indicate if a vessel or other fluid source is connected to the system. The pressure at the inlet pressure sensor 250 may indicate that a fluid source is connected when the pressure is greater than atmospheric. In an embodiment, a pressure greater than about 0.2 psig, greater than about 0.4 psig, greater than about 0.6 psig, greater than about 0.8 psig, or greater than about 1.0 psig may indicate that a fluid source is connected to the system. The inlet pressure sensor may also provide an indication that a fluid source connected to the system is being provided at a pressure than can overpressure the filter assembly 102. In an embodiment, a pressure greater than about 5 psig, greater than about 7.5 psig, greater than about 10 psig, greater than about 12.5 psig, or greater than about 15 psig may indicate that the fluid source is being pressurized and supplied to the system 200.

In any embodiment, the fluid injection system 200 may comprise an optional pre-filter 230. The pre-filter 230 can be configured to separate particles above a predetermined size from the fluid prior to the fluid passing through a filtration device within the filter assembly 102. In some embodiments, the pre-filter 230 may be useful in removing larger particles that could damage the filtration device in the filter assembly 102 and/or clog one or more conduits leading to and/or out of the filter assembly 102. The pre-filter 230 may be disposed upstream of the filter assembly 102 as shown in FIG. 2. In some embodiments, the pre-filter and/or an additional pre-filter may be disposed within the filter assembly 102 (e.g., upstream of a filtration device within the filter assembly 102). For example, a pre-filter 230 may be disposed within an inlet section of the filter assembly 102. In some embodiments, a pre-filter 230 may be disposed in a lower section of the filter assembly 102. For example, a strainer basket may be disposed within a sump or catch basin within the filter assembly 102 where it may collect larger solid particles such as rocks, drill cuttings, and the like that settle out of the fluid passing through the filter assembly 102. By locating the pre-filter 230 and/or an additional pre-filter within the filter assembly 102, the larger particles retained by the pre-filter may be prevented from passing to the solids collection vessel 240 as described in more detail below. In some embodiments, the optional pre-filter 230 may be associated with the vessel 104, pipeline, or other fluid source rather than or in addition to forming a part of the system 200.

Various devices may be used as suitable pre-filters including strainer baskets, screen filters, settling chambers, centrifugal separators (e.g., vortex separators, cyclone separators, etc.), and the like. The pre-filter 230 may be configured to remove particles larger than about 0.25 inches, larger than about 0.1 inches, or larger than about 0.05 inches from the fluid prior to the fluid passing through a filtration device within the filter assembly 102. In addition to removing larger solid particles, the pre-filter may serve to remove one or more additional contaminants. For example, the pre-filter may comprise an optional chemical treatment for removing one or more chemical contaminants (e.g., treatment chemicals, gels, salts, etc.), and/or an oil-water separator for removing hydrocarbons. The pre-filter may be periodically cleaned or serviced to remove any contaminants and/or replace and filter elements such as adsorbents, filters, chemical treatments, etc. As described above, additional filters and/or separators may also be disposed downstream of the filter assembly 102 (e.g., in the storage section 112). In use, the optional pre-filter 230 may be used to remove at least a portion of the suspended solids from the fluid such as any solids above a predetermined size. The fluid may then pass through a filtration device within the filter assembly 102 for further separation of the suspended solids.

A fluid storage vessel 272 may be used to retain cleaning fluid for use with the system 200. A cleaning fluid supply may be used to perform a cleaning cycle as described in more detail herein. The cleaning fluid storage vessel 272 may be in fluid communication with the outlet of the filter assembly 102 through cleaning fluid valve 270. The cleaning fluid valve 270 may be in signal communication with the control system 212 over a communication link 271, which may comprise any of the types of communication links described herein. The cleaning fluid storage vessel 272 may be coupled to a pump 274, which may be used to supply the cleaning fluid to the filter assembly 102 during a cleaning cycle. The pump 274 may be in signal communication with the control system 210 over communication link 275, which may include any of the communication links described herein.

The cleaning fluid storage vessel 272 may comprise any type of tank or vessel configured to hold a fluid for performing one or more cleaning cycles. The cleaning fluid may be received in the cleaning fluid storage vessel 272 when the cleaning fluid valve 270 is actuated to an open position. A level sensor within the cleaning fluid storage vessel 272 may be used to provide an indication that the cleaning fluid level within the cleaning fluid storage vessel 272 is below a threshold level. The cleaning fluid valve 270 may then be actuated to an open position to allow fluid pass from the filter assembly 102 to enter the cleaning fluid storage vessel 272. When the fluid level within the cleaning fluid storage vessel 272 is above an upper threshold level, the cleaning fluid valve 270 may be actuated to a closed position. The pump 274 may then be actuated to provide the cleaning fluid to the filter assembly (e.g., to nozzles or fluid outlets within the filter assembly 102) during a cleaning cycle.

The cleaning fluid may comprise fluid that has passed through filter assembly. The cleaning fluid may generally comprise an aqueous fluid, and the actuation of the cleaning fluid valve 270 may be controlled to correspond to a period during which a predominately aqueous fluid is passing through the filter assembly 102. In general, the type of fluid may be specified by a user when the filtration process is initiated. Certain types of fluids, such as production fluid, may be expected to comprise relatively clean aqueous fluid (e.g., brine) as compared to other types of fluids such as flowback fluids. Further, the fluid composition associated with each fluid volume to be filtered may change during the filtration process. For example, the first fluid received may generally comprise solids that may have settled, the middle portion may predominately comprise an aqueous fluid, and the last amount of fluid may comprise hydrocarbons that have separated and risen to the top of a delivery vessel. The control system 210 may select at time during which the central portion of the fluid is being filtered for a volume of produced water to open the cleaning fluid valve 270. This may allow relatively clean produced aqueous fluid that has passed through the filter assembly 102 to be stored in the cleaning fluid storage vessel 272 and used during the cleaning cycles within the filter assembly 102.

The portion of the suspended solids separated in the filter assembly 102 may be periodically removed. As noted above, various types of filtration devices may be used with the fluid injection system 200. For example, various types of removable and/or disposable filters (e.g., filter socks) may be used to capture the suspended particles. When the filtration device become full or saturated, the suspended solids and/or the entire filtration device may be removed and sent for disposal. In some embodiments, a filter assembly comprises a filtration device that remains in position within the filter assembly 102, as described in more detail below. In these embodiments, the suspended solids can collect within the filter assembly 102 during use.

In order to collect the separated solids to allow the filter assembly 102 to continue to operate, a solids collection vessel 240 may be used to periodically collect the suspended solids. The solids collection vessel 240 may assume several forms such as a sump, a tank, or the like. The solids collection vessel 240 can be sized to hold a suitable amount of fluid and the suspended solids, and the solids collection vessel 240 may comprise a weir or other means of decanting any collected fluids from the separated solids. In an embodiment, the solids collection vessel comprises a sump, which can comprise a pit or trough located below the facility. The sump may have an exposed top allowing the fluid and separated solids to flow into the sump. A grate or other cover may be used to limit entry into the sump. In some embodiments, the solids collection vessel 240 can comprise a tank or vessel that is in selective fluid communication with the filter assembly 102. The solids collection vessel 240 may be disposed below the filter assembly 102 to allow for gravity flow of fluid and solids into the solids collection vessel 240. If the solids collection vessel 240 is located level with and/or above the filter assembly 102, a pump or other transfer device can be used to transfer a fluid and any separated solids from the filter assembly 102 into the solids collection vessel 240. The solids collection vessel 240 can have a sloped bottom to aid in removing the contents of the solids collection vessel 240. For example, the solids collection vessel may be configured to separate any fluid flowing into the vessel from the solids based on gravity settling. The fluid may then be recycled back through the same filter assembly 102 or a different filter assembly 102 for injection into the injection well 106 while retaining the solids in the solids collection vessel 240, as described in more detail herein. The solids collection vessel 240 can be coupled to a drain or outlet of the filter assembly 102. A drain actuator valve 242 may be disposed in a fluid conduit coupling the filter assembly 102 and the solids collection vessel 240 to selectively control the flow of fluid and/or solids from the filter assembly 102 to the solids collection vessel 240. The drain actuator valve 242 can be the same or similar to any of the valves described with respect to the actuator valve 202 herein. In some embodiments, the drain actuator valve 242 can be a manually actuated valve. In some embodiments, the drain actuator valve can comprise an automatically actuated valve and be connected to the control system 210 by a communication link 244, as described in more detail below.

The communication link 244 may be the same or similar to any of the communication links described above.

During use of the fluid injection system 200, the drain actuator valve 242 would generally be configured in a closed position, thereby preventing fluid communication between the filter assembly 102 and the solids collection vessel 240. This configuration may prevent the fluid from flowing into the solids collection vessel 240, and rather, may direct the fluid to the injection well 106. When the fluid injection system 200 is not being used to filter fluid for injection into the injection well 106, the actuator valve 202 may be closed and the drain actuator valve 242 may be opened. A cleaning cycle may be performed to remove the separated suspended solids from the filter assembly 102. As described in more detail herein, a cleaning fluid (e.g., the cleaning fluid stored in cleaning fluid storage vessel 272) may be used to clean the filtration device and wash the separated solids into a drain. The cleaning fluid may generally comprise fluid having passed through the filter assembly, though a different fluid such fresh water may also be used to clean the filter assembly 102. The fluids and the solids may then pass through the drain actuator valve 242 and into the solids collection vessel 240. Upon removal of some or all of the separated solids from the filter assembly 102, the drain actuator valve 242 can be closed and the fluid injection system 200 prepared for filtering additional fluid for injection.

In an embodiment, the control program may be configured to perform the cleaning cycle. When controlled by the control system 210, the cleaning cycle can be manually initiated and/or automatically initiated. In a manual initiation, an input may be received at the input device 218 and/or a separate input device used for the cleaning cycle. The cleaning cycle may then begin when the system is ready and the filter assembly 102 is not filtering a fluid. In an automatically initiated cleaning cycle, one or more sensors and/or the control program may automatically initiate a cleaning cycle. As described in more detail below, the control program may automatically initiate a cleaning cycle when either pressure on either side of the filtration device and/or a pressure differential across the filtration device exceeds a threshold. In some embodiments, the flow meter may be used to automatically initiate the cleaning cycle by detecting a low flow condition. In some embodiments, the level sensors within the filter assembly 102 may be used to automatically initiate the cleaning cycle. For example, when a low level indicator is triggered to indicate a level differential across the filter element, the control program may initiate the cleaning cycle. In some embodiments, a combination of sensor inputs may be used to trigger the cleaning cycle. For example, a pressure as detected by the inlet pressure sensor 250 may indicate that a fluid head is still present at the inlet, and the low level sensor may detect a low level within the filter assembly 102. The combination of these sensor readings may then be used to trigger a cleaning cycle. Any other combination of sensor readings may also be used to trigger the cleaning cycle. In some embodiments, a cleaning cycle may automatically be initiated based on various criteria including, for example, a predetermined number of uses of the fluid injection system 200 (e.g., after each use, after every other use, after every five uses, etc.), certain time intervals (e.g., once a day, once a week, once a month, etc.), a predetermined volume of fluid that is filtered, and the like.

In response to initiating the cleaning cycle, the control program may check the position of the actuator valve 202 using, for example, a valve position indicator. If the actuator valve 202 is in an open position, the control program may interrupt the filtering process and close the actuator valve 202. In some embodiment, the control program may wait until the actuator valve 202 closes if a fluid is being filtered through the system 200. When the actuator valve 202 is in the closed position, the controller 212 may send a signal over the communication link 244 to automatically actuate the drain actuator valve 242 to an open position. The control program may then direct the cleaning fluid to flow into the filter assembly 102, thereby washing at least a portion of the separated solids into the drain. The separated solids and the cleaning fluid may then pass out of the filter assembly 102 to the solids collection vessel 240. The cleaning fluid may flow into the filter assembly 102 for a predetermined period of time and/or until a predetermined volume of cleaning fluid is used. The control program may then cease flowing cleaning fluid into the filter assembly 102 and signal the drain actuator valve 242 to close. Once the drain actuator valve 242 is in a closed position, the control system 210 may be in a neutral position and ready to filter additional fluid through the filter assembly 102. A startup routine may then be performed to begin filtering a new fluid or continue the filtering process to filter a fluid through the system 200.

In an embodiment, the fluid injection system 200 may comprise an optional pad 246 configured to receive the vessel 104. The pad 246 may comprise a depression or other basin that is suitable to receive a vehicle and/or the vessel 104 containing the fluid to be filtered through the fluid injection system 200. The pad 246 may be substantially sealed to fluid flow out of the pad 246 through the sides and bottom. For example, the pad 246 may be formed from concrete, or alternatively have a water-proof or water-resistant lining (e.g., a polymer sheet lining, a clay lining, etc.). The pad 246 may be sloped to capture any fluid in a lower portion. This configuration may allow the pad 246 to capture any fluid leaks occurring during the transfer of the fluid from the vessel 104 into the fluid injection system 200. In some embodiments, the solids collection vessel 240 may extend below the pad 246. For example, the solids collection vessel 240 may comprise a sump that extends below the pad 246. A grate placed over the sump may be suitable for supporting any vehicles driving into the pad 246. Any fluid spilled on the pad 246 may then flow directly into the sump. In some embodiments, the pad 246 can comprise a drain in fluid communication with the solids collection vessel 240 through a drain line. The drain may or may not comprise a valve for selectively controlling the flow of fluid into the solids collection vessel 240. Since the pad 246 is expected to capture a relatively small volume of fluid, a valve in the drain line may not be needed. In use, at least a portion of the fluid leaving the vessel 104 or the vehicle and not entering the filter assembly 102 may be captured within the pad 246. This fluid may generally be referred to as spilled fluid. The spilled fluid may then be transferred to the solids collection vessel 240. Once in the solids collection vessel 240, the fluid and any solids in the fluid may be captured and removed upon cleaning out of the solids collection vessel 240.

The separated solids may be transferred into the solids collection vessel 240 with the cleaning fluid during a cleaning cycle, with the fluid to be filtered when spills are captures, and/or with the fluid to be filtered if the drain valve 242 is opened with fluid in the filter assembly 102. Thus, both fluid and the filtered solids may be transferred to and accumulate within the solids collection vessel 240. The filtered solids may be concentrated by separating the fluid from the solids within the solids collection vessel 240, for example through a fluid removal line 248. Various structures can be used to separate any fluids within the solids collection vessel 240 including, but not limited to, a weir, a drain line, a separate screen element, and the like. A valve system such as a float and valve system may be used to automatically drain the fluid from the solids collection vessel 240 when the fluid level within the solids collection vessel 240 rises above a certain level. The fluid may be removed from the solids collection vessel 240 and transferred back to the filter assembly 102 using a suitable fluid connection. In some embodiments, a dedicated fluid injection system comprising an inlet fluid conduit, a filter assembly 102, an actuator valve 202, and a pump 204 may be used to receive and filter the fluid from the solids collection vessel 240. By removing the fluid from the solids within the solids collection vessel 240, the solids may be concentrated for later removal and disposal. Further, the separation and filtration of the fluid in the solids collection vessel 240 may further aid in preventing a user from bypassing the fluid injection system by simply dumping the fluid to be filtered on the pad 246 and/or directly into the solids collection vessel 240 (e.g., directly into a sump under the pad 246).

In an embodiment, the fluid within the solids collection vessel 240 can be separated within the solids collection vessel 240 and transferred to a filter assembly 102, which may be the same filter assembly draining into the solids collection vessel 240 or a different filter assembly. As shown in FIG. 2, a fluid removal line 248 may allow fluid to be transferred from a clean portion of the solids collection vessel 240 and passed to an inlet of the filter assembly 102 through the recycle valve 249. The recycle valve 249 may be in signal communication with the control system 210 through communication link 247, which may comprise any of the types of communication links described herein. In order to filter the fluid from the solids collection vessel 240, the recycle valve 249 may be actuated to an open position, and the pump 206 may be actuated. In some embodiments, a booster pump may be coupled to the fluid removal line 248 to pass the fluid from the solids collection vessel 240 to the filter assembly 102. When a booster pump is used, the recycle valve 249 may be opened, the booster pump may be actuated, the release valve 318 in the filter assembly 102 may be opened, and the fluid may be allowed to fill the filter assembly 102. When the level sensors indicate that the fluid has filled the filter assembly, the release valve 318 may be closed and the pump 206 may be actuated to filter the fluid through the filter assembly 102. When a fluid level within the solids collection vessel 240 drops below a lower threshold, for example as determined by a level sensor in the solids collection vessel 240, the pump 206 may be turned off, and the recycle valve 249 may be closed. The fluid may then be allowed to accumulate in the solids collection vessel 240 before further recycling the fluid to the same or a different filter assembly.

By transferring the fluid from the solids collection vessel 240 through the filter assembly 102, the system 200 may ensure that the fluid passing to the injection well has been filtered. Further, recovering the fluid from the solids collection vessel 240 may further improve the recovery of hydrocarbons from the system 200. In general, the fluid passing to the solids collection vessel 240 may comprise some amount of the hydrocarbons entering the system. The ability to separate the fluid from the solids and recycle the fluid through the filter assembly 102 to the downstream separation section 112 may allow any hydrocarbons in the fluid to be recovered in the separation section 112. This may improve the economics of operating the filtration system 200.

The solids collection vessel 240 may be cleaned out to remove the accumulated separated solids. The solids collection vessel 240 functions to collect the solids separated from the fluid, and optionally, any solids captured in the pad 246. The solids and any fluid (e.g., the cleaning fluid) present in the solids collection vessel 240 may be removed for offsite disposal as the solids collection vessel 240 fills and/or at periodic intervals. In general, the solids collection vessel 240 may comprise a cleanout line or opening to allow the contents of the solids collection vessel 240 to be removed. For example, the top of the solids collection vessel 240 may be opened and readily accessible for cleaning out the solids. When the solids collection vessel 240 comprises a vessel, the vessel may have a lid or other opening to allow access to the solids within the vessel. In an embodiment, a vacuum truck and service may be used to clean out the sump 240 and remove the solids. The cleanout service may remove the separated solids without directly physically handling the solids (e.g., without direct contact between any personnel and the solids), thereby improving the health and safety of the workers removing solids when the solids contain hazardous compounds (e.g., NORM, hazardous chemicals, etc.). The contents of the solids collection vessel 240 may then be transported offsite for disposal at an appropriate location.

Figure 3:
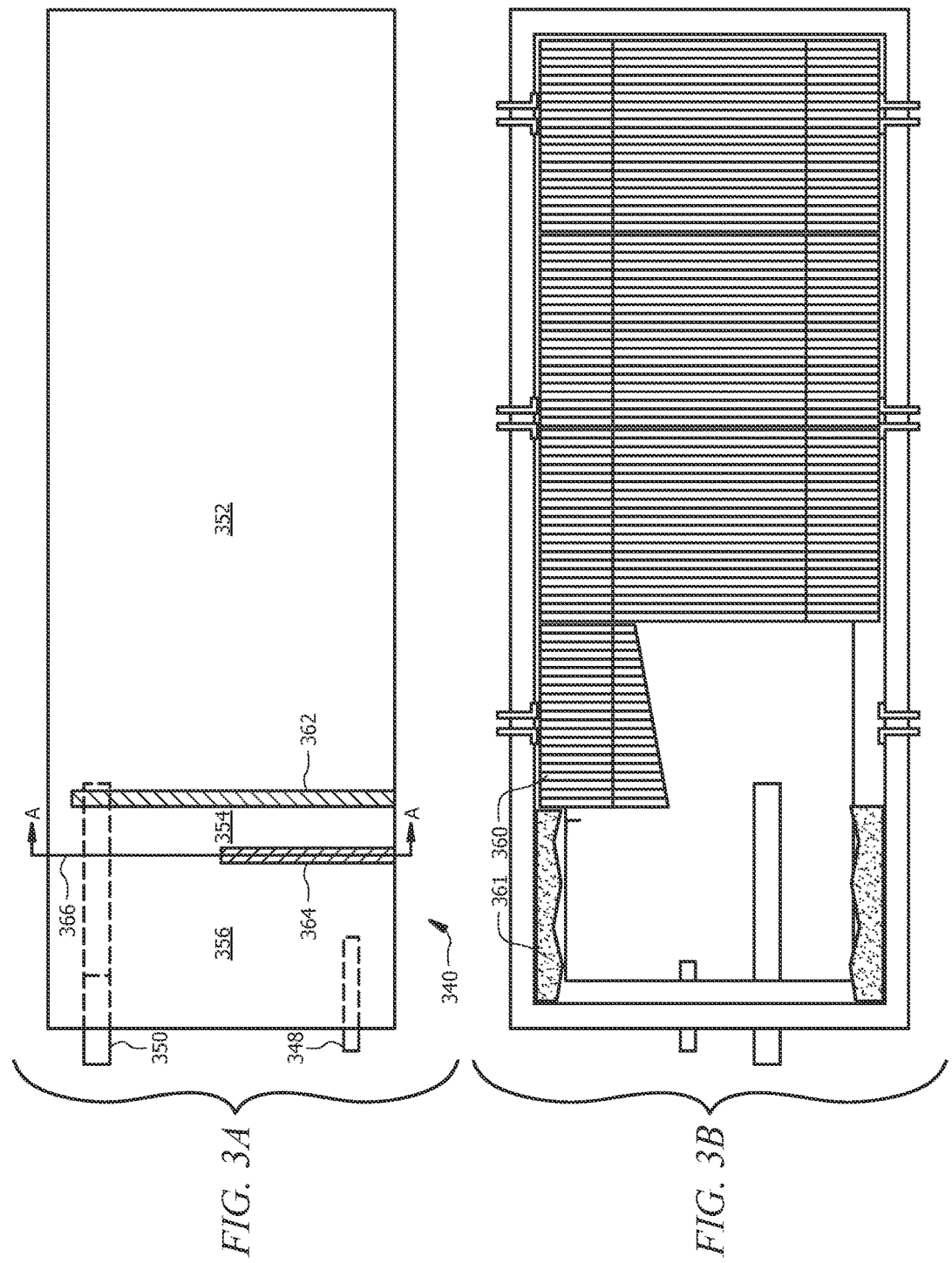
FIGS. 3A and 3B illustrate schematic views of a solids collection vessel according to an embodiment.

An embodiment of a solids collection vessel 340 is illustrated in FIG. 3. The solids collection vessel 340 may be used as the solids collection vessel (e.g., solids collection vessel 240, etc.) in any of the embodiments described herein. The solids collection vessel 340 may generally comprise an elongated vessel having a square to rectangular cross section. While illustrated as having a rectangular cross section, the solids collection vessel 340 may also have a circular, oval, frusto-conical, or other cross-sectional shape. The solids collection vessel 340 may generally be configured to retain a fluid within its interior in one or more sections, and the sides and bottom of the solids collection vessel 340 may be substantially water tight. The top of the solids collection vessel 340 may comprise a cover that can be solid, perforated, or open. In an embodiment, at least a portion of the top of the solids collection vessel 340 may comprise a grating 360. The grating may allow any solids and/or liquids spilled during the filtering process to be captured within the solids collection vessel 340. A second portion of the top of the solids collection vessel 340 over a cleaned portion of the liquid may be covered by a solid cover 361 to prevent any solids from entering the sections of the solids collection vessel 340 containing fluids with at least a portion of the solids removed.

One or more interior structures may be disposed within the solids collection vessel 340 to divide the interior into multiple sections. A weir 362 may be disposed within the solids collection vessel 340 to define a first separation section 352. The drain line 350 from the filter assembly (e.g., filter assembly 102 of FIG. 2) may be configured to pass any fluid from the drain in the filter assembly to the first separation section 352. Any fluids entering from the pad (e.g., spilled fluids, rainwater, etc.) may also be configured to pass into the first separation section. The weir 362 may maintain a fluid level within the first separation section 352, and as any entering fluid exceeds the level of the weir, the fluid may pass over the weir 362 into a second separation section 354. The first separation section 352 may serve as a settling chamber to allow any solids or heavy components to settle out of the fluid entering the first separation section 352. The solids entering with the fluid may also comprise solids that tend to float. These solids may pass with the fluid over the weir 362 and into the second separation section 354. A second, and optional, weir 364 may separate the second separation section 354 from a fluid outlet section 356. A screen 366 may extend from the weir, if present, to a top of the solids collection vessel 340. The screen may be sized to allow the liquid to pass to the fluid outlet section 356 while retaining any solids (e.g., any floating solids) within the second separation section. In some embodiments, the second weir 364 may not be present, and the screen 366 may extend from the bottom of the solids collection vessel to the top. A fluid removal line 348 may be in fluid communication with the fluid outlet section 356 and may be configured to pass the liquid in the fluid outlet section 356 to a filter assembly, which may be the same filter assembly draining to the solids collection vessel 340 through the drain line 350 and/or any other filter assembly.

One or more sensors may be disposed in the various sections 352, 354, 356 to provide an indication of the liquid levels in each section. When the liquid level in the fluid outlet section 356 rises above a threshold as indicated, for example by a level sensor, the fluid may be transferred to a filter assembly. As the fluid level drops below a second threshold as indicated, for example by the same or a different level sensor, the fluid transfer may cease in order to allow the fluid level to refill before transferring the fluid to a filter assembly again. By capturing the solids within the solids collection vessel 340 and recycling the liquid portion to a filter assembly, the solids collection vessel 340 may serve as a solids concentrator. Further, recycling the fluid to a filter assembly may ensure that any fluid passed to the injection well has passed through a filter assembly to remove any solids greater than a predetermined size.

The solids and any fluid (e.g., the cleaning fluid) present in the solids collection vessel 340 may be removed for offsite disposal as the solids collection vessel 340 fills and/or at periodic intervals. The heavy solids may be separated in the first separation section 352, and the lighter solids that float may be retained in the second separation section 354 behind the screen 366. A manual inspection or solids level sensor may be used to provide an indication of when the solids level has built up in the solids collection and should be separated. When the solids level has built up to a certain level, the solids may be removed from the first separation section 352 and/or the second separation section 354. The solids collection vessel 340 may comprise a cleanout line or opening to allow the contents of the solids collection vessel 340 to be removed. For example, the grate 360 and/or the cover 361 may be open and readily accessible for cleaning out the solids. In an embodiment, a vacuum truck and service may be used to clean out the solids collection vessel and remove the solids. The cleanout service may remove the separated solids without directly physically handling the solids (e.g., without direct contact between any personnel and the solids), The contents of the solids collection vessel 340 may then be transported offsite for disposal at an appropriate location.

Returning to FIG. 2, in addition to the configuration and arrangement of the control system 210 described above, the control system 210 may be used to perform various other actions during the operation of the system 200. In an embodiment, the control system 210 may be used to control and report on one or more components of the storage section 112. For example, the control system 210 may selectively operate the high pressure pump when the water storage tank reaches a threshold level, and shut off the high pressure pump when the water storage tank drops below a threshold. Similarly, the control system 210 may report the amount of hydrocarbons in the hydrocarbon storage tanks to allow an operator to arrange for transport and sale of the collected hydrocarbons. In addition, the control system 210 may be used to receive and record additional information about the fluid to be injected, the operator delivering the fluid, the system filtering and injecting the fluid, video from the fluid injection site, and the like. Various devices such as lights, cameras (video cameras inside and/or outside of the facility, and security devices may be used to provide additional information for use with the system.

The additional information may be transmitted to an outside source. For example, the controller 212 may comprise a communication connection to an external server and send the information to the external server for a variety of purposes. For example, the control system 210 may be communicatively coupled to the internet to provide a connection to a server external to the fluid injection site. In an embodiment, one or more items of information may be sent to a regulatory agency for automatically complying with various regulations of the injection system 200 and the injection well 106. In some embodiments, one or more items of information may be sent to an operator of the fluid injection system 200 to provide an update on the status of the system 200. This may be useful for unmanned facilities. For example, the use of the system can be remotely monitored through the receipt of information from the control system 210. Should any operational issues arise, one or more error messages may be sent from the control system 210, thereby indicating that repair technician is required. The error messages may comprise the results of one or more diagnostic tests, thereby allowing for the proper technician to be dispatched along with the proper tools and equipment to correct the issue.

All of the information for the system including any additional information may be viewed remotely by an operator of the facility. In an embodiment, a web based interface may be used to receive and display the information. A password or other security measure may be required to authenticate a user for the web based interface. The web based interface may allow past information such as the user inputs, fluid amounts, run time, etc to be viewed. The web based interface may also allow present information to be viewed in real-time or near real-time. As used herein, near real-time refers to events occurring within the latency and communication delays associated with a network connection. For example, near real-time transmission of information to the web based interface may occur within about 2 minutes, within about 5 minutes, or within about 15 minutes. Information such as a video feed of the system 200, system operating information (e.g., filtering, cleaning, pressures, flow rates, level indications, etc.), user inputs, any maintenance requests or warning, and the like may be displayed on the web based interface. The web based interface may also allow for inputs to be received from an operator and communicated to the system 200. For example, an operator may shut down a system 200, switch a system to a cleaning cycle, perform maintenance at a distance by initiating one or more diagnostic routines, procedures, or programs. The web based interface may also allow the operator to communicate with the users at the site (e.g., via audio, video conferencing, etc.) to provide information and the like.

While FIG. 2 illustrates the fluid injection system 200 comprising a single filter assembly 102 coupled to an actuator valve 202 and a pump 204, the fluid injection system 200 may comprise any number of components. In general, the fluid injection system 200 may be used to service a single vehicle and vessel 104. In order to service additional vehicles, a plurality of filter trains comprising corresponding filter assemblies 102, actuator valves 202, and pumps 206 may be used. For example, a multi-lane facility may have a dedicated filter train for each lane. Each of the filter trains may have the filter assemblies 102, actuator valves 202, and pumps 206 arranged in series, with the output of each filter train coupled to the storage section 112. When multiple filter trains are present, they may be cross-connected to each inlet and/or the inlet from one or more solids collection vessels. As noted above, the fluid injection system 200 may comprise a dedicated filter train comprising a filter assembly 102, an actuator 202, and a pump 206 for use in filtering any fluid collected in the solids collection vessel 240. When multiple filter trains are present, the control system 210 may control all of the filter trains. In some embodiments, individual control systems may be used with each filter train. In some embodiments, the filter assembly 102, actuator valve 202, and pump 204 may be sized to handle fluid delivered from multiple vessels 104. For example, a plurality of fluid inlets may be in fluid communication with the filter assembly 102 for receiving fluid from a plurality of vessels 104, using for example a manifold or a plurality of fluid inlets to the filter assembly 102. The filter assembly 102 may be appropriately sized to handle the potential combined flow rate from all of the plurality of vessels 104 through the filter assembly 102. The various combinations and configurations of the fluid injection system 200 can allow a facility housing the fluid injection system 200 to be tailored to handle the injection needs of a particular injection well site.

Figure 4:
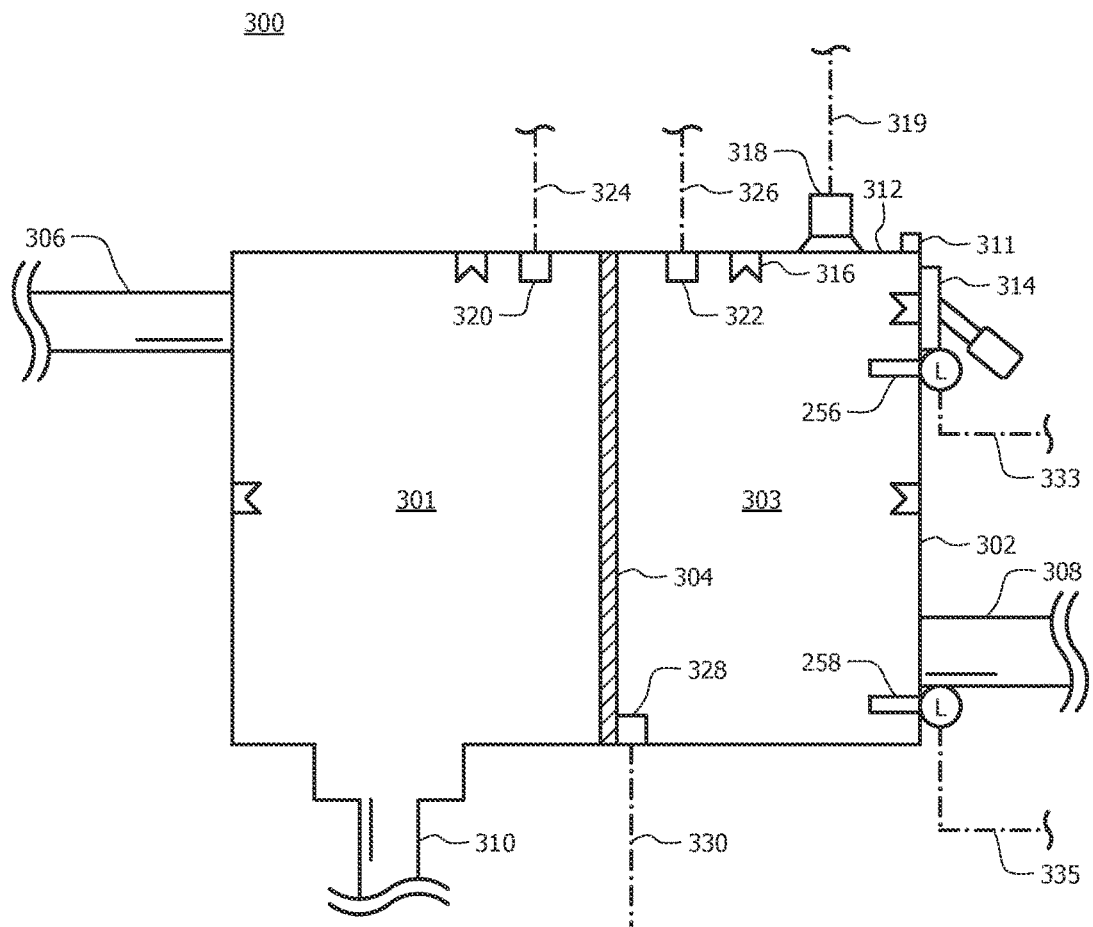
FIG. 4 illustrates a schematic cross-sectional view of a filter assembly according to an embodiment.

In some embodiments, a portion of the fluid injection system 200 may be provided as a portable unit. For example, the filter assembly 102, the actuator valve 202, the pump 206, the control system 210, and the additional optional components associated with these units (e.g., the pre-filter 230, the solids collection vessel 240, the pad 246, the input device 218, etc.) may be provided as a portable unit. In general, a portable unit is capable of being manufactured in one location and transported to a desired location. For example, suitable portable units can include, but are not limited to, skid mounted units, container units, a truck or trailer mounted unit, a series of skid mounted, container, and/or trailer units, and the like. In this embodiment, the equipment may be configured to fit within a portable housing and can be further configured to operate within the housing when delivered to a suitable injection well site. The portable unit may be delivered to a well site and fluidly coupled and/or communicatively coupled (e.g., linked to the control system 210) to a storage section 212, which may in turn be coupled to an injection well 106. While the portable unit may be manufactured and delivered to a site, it may be fixed in position at the site. The ability to deliver at least a portion of the fluid injection system 200 as a portable unit may allow for the retrofitting of existing injection well systems and/or for the efficient installation of the fluid injection system at a new and/or converted wellbore. For example, an existing fluid injection system utilizing disposable filters can be retrofitted with the fluid injection system 200 described herein by delivering the portable unit and coupling it to an existing storage section 112, thereby replace the disposable filter system. The use of portable systems may also allow for efficient scaling of the fluid handling capabilities of an injection well site by allowing for the addition of modular fluid filtering trains. As noted above, the filter assembly may take various forms. A schematic cross-section of an embodiment of a filter assembly 300 is illustrated in FIG. 4. In an embodiment, the filter assembly 300 may be used as the filter assembly 102 described above with respect to FIGS. 1 and 2. In general, the filter assembly 300 may comprise a housing 302 containing a filtration device 304, a fluid inlet 306 for receiving the fluid to be filtered, a fluid outlet 308 passing the filtered fluid downstream, and a drain 310 that may provide fluid communication with a solids collection vessel (e.g., solids collection vessel 240 as shown in FIG. 2 and/or solids collection vessel 340 shown in FIG. 3). The filter assembly 300 may comprise several optional components such as a one or more nozzles 316 configured to allow the filtration device 304 and housing 302 to be cleaned, a release valve 318 configured to selectively provide fluid communication with the interior of the housing 302, a pressure relief valve 311, and/or one or more sensors (e.g., pressure sensors 320, 322, level sensors 256, 258, filter element position sensor 328, etc.) for detecting various parameters within the housing 302.

The housing 302 serves to provide a substantially sealed chamber for containing the various components of the filter assembly 300. The filter assembly 300 depicted in FIG. 4 shows the housing 302 comprising a generally rectangular cross-section. While shown as rectangular, various other cross-sections may also be possible. For example, the housing 302 may take the form of a cylindrical vessel or tank. The housing 302 can be configured to maintain an expected operating pressure within the chamber during use. In general, the housing 302 may be formed from a suitable material to allow the pressure to be maintained during use. For example, the housing 302 may be formed from a metal, a polymer, a composite material, or other suitable material. The housing 302 can also be sized to provide a suitable space velocity through the housing 302 and filtration device 304 during use.

The housing 302 may comprise multiple components to allow for access to the chamber formed within the housing 302. In an embodiment, the housing 302 may comprise a cover 312 configured to selectively engage the housing 302 body. One or more seals may be disposed between the cover 312 and the body to form a sealing engagement. In general, the use of a pump to pull fluid into the housing 302 may create a vacuum (i.e., a pressure less than atmospheric pressure) within the tank, and the seals may be configured to provide a sealing engagement under a vacuum condition. Various types of connection devices may be used to couple the components of the housing 302. As shown in FIG. 4, one or more latches 314 may be used to maintain the engagement between the cover 312 and the body, though other connection devices such as bolts, screws, clamps, threaded connections, and the like may also be used.

The filtration device 304 is generally disposed in the housing 302 such that the filtration device 304 divides the chamber into an inlet portion 301 and an outlet portion 303. The fluid inlet 306 is disposed in the housing 302 and is configured to receive a fluid comprising the suspended solids into the inlet portion 301 of the chamber. Similarly, the fluid outlet 308 is disposed in the housing 302 and is configured to pass the fluid out of the housing 302 from the outlet portion 303 once it has passed through the filtration device 304. The filtration device 304 is configured to separate at least a portion of the suspended solids from the fluid and retain the separated solids in the inlet portion 301 of the housing 302.

Figure 5:
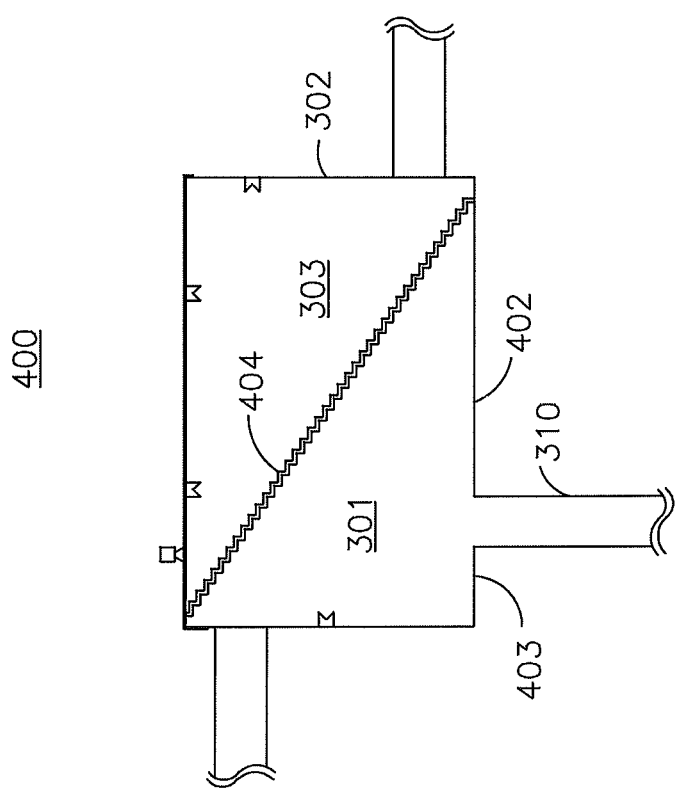
FIG. 5 illustrates a schematic cross-sectional view of another filter assembly according to an embodiment.

The drain 310 is disposed in the housing 302 and is configured to pass the portion of the suspended solids removed from the fluid out of the inlet portion 301 of the housing 302. A portion of the fluid may pass with the separated suspended solids out of the drain 310. In an embodiment, the drain 310 may be coupled to a solids collection vessel as described above. The drain 310 may generally be disposed in a lower portion of the housing 302 to allow any solids that settle out of the fluid after being separated by the filtration device 304 to be passed through the drain 310. In an embodiment as shown in FIG. 5, a lower portion of the housing 302 may be sloped to aid in collecting the solids near the drain 310 and allowing the solids to pass out of the drain 310 when the drain 310 is opened. For example, the lower surfaces 402, 403 may be sloped towards the drain 310. In some embodiments, a catch basin may be formed in the housing 302 at or near the drain to collect the separated solids. A strainer basket may be disposed in the catch basin to prevent larger solids from passing through and potentially clogging the drain. While shown as being disposed in the lower surface of the housing 302 in FIGS. 4 and 4, the drain 310 may be disposed above the bottom of the housing 302, and the solids may be carried out of the drain 310 by being re-suspended in a fluid and passed out with the fluid through the drain 310. In some embodiments, an outlet line may be disposed at or near the bottom of the housing 302 to draw fluid from the lower portion of the housing 302 while exiting the top or upper portion of the housing 302.

As shown in FIG. 4, the filtration device 304 cooperates with the housing 302 so that the fluid entering through the fluid inlet 306 and exiting through the fluid outlet 308 passes through the filtration device 304. The filtration device 304 can be formed in a rectangular, square, round, elliptical, trapezoidal, cylindrical, polygonal, or any other shape configured to cooperate with the shape of the housing 302. In general, the edges on the perimeter of the filtration device 304 can form a seal against one or more internal surfaces of the housing 302 to reduce or prevent channeling of fluid around the filtration device 304. In some embodiments, a frame or holder may be disposed within the housing 302 to receive the filtration device 304.

The filtration device 304 may be sized to provide a suitable filtration area for a desired application. In general, the greater the surface area of the filtration device 304, the greater is the volume of fluid that can be filtered through the filtration device 304 for a given pressure drop. In general, the filtration device 304 may be sized to allow the filtration device 304 to be removed from the housing 302, when needed, and replaced. For example, if the filtration device 304 becomes worn or damaged, a technician can access the housing 302 and replace the filtration device 304.

The filtration area through the filtration device 304 may be affected by the length and width of the filtration device 304, the orientation of the filtration device 304 within the housing 302, and the design of the filtration device 304. As shown in FIG. 4, the filtration device may comprise a planar screen oriented substantially perpendicular to the interior surfaces of the housing 302. The filtration device 304 may be arranged perpendicular to the width or length of the housing, wherein the orientation can affect the amount of filtration area available for a rectangular housing. In general, as the angle of the filtration device 304 varies from perpendicular with respect to the interior surfaces of the housing 302, the filtration area will increase. As shown in FIG. 5, the filtration device 404 may be disposed at a non-perpendicular angle with respect to the interior of the housing 302, and the filtration area of the filtration device 404 may be increased relative to the orientation of the filtration device 304 illustrated in FIG. 4.

The design of the filtration device may also affect the filtration area. As shown in FIG. 4, the filtration device 304 may comprise a planar construction. A greater filtration area may be achieved using a pleated, corrugated, folded, or other non-planar design. For example, FIG. 5 illustrates a pleated filtration device 404 configured to provide additional filtration area for filtering solids from the fluid. While a greater surface area may be obtained by appropriately orienting the filtration device 304 and providing a non-planar design, such considerations may be balanced by the ability to clean the filtration device 304 should it become clogged or otherwise impeded by the filtered solids.

In order to receive the fluid and separate at least a portion of any suspended solids from the fluid, the filtration device 304 can comprise one or more layers configured to remove the particulates from the fluid as well as optional structural support layers. Referring to FIG. 4, various types of filter media may be used to form the filtration device 304. In an embodiment, the filtration device 304 may comprise a type of porous media such as a woven, non-woven, or felted material constructed of a suitable material. Suitable materials may comprise metals, polymers, ceramics, natural or synthetic fibers, and/or any combination thereof. In an embodiment, the filtration device 304 may comprise a metallic screen. Additional filter media may also be used such as granular and/or particulate media such as diatomaceous earth, carbon, zeolites, structured packing, and any combination thereof. When a granular or particulate media is used in the filtration device 304, it may be stabilized between adjacent layers of porous media to retain the material in position. When multiple layers are used to form the filtration device, each layer can be implemented using a single layer of filter media, or with multiple layers of filter media, either bonded together to form a single layer or as separate layers.

The filtration device 304 may also comprise one or more structural support layers such as structural screen, wires, mesh, perforated metal sheets, or the like. A structural support layer may be configured to retain any filter media in position in the flow path of the fluid and resist deformation of the filter media during the operation of the fluid injection system. In general, the structural support layer may be disposed on the downstream side of the filtration device 304, though other configurations are possible. While the structural support layers may provide a filtration function to some degree, the pore size through the structural support may be substantially larger than the pore size through the filter media used to separate the one or more suspended solids from the fluid.

The porosity of the filter media may vary depending on the number of layers, the size of any fibers used to form the filter media, and the pore size formed by the filter media. When multiple layers of filter media are present, the layers may each have the same or different construction and/or pore size. The use of a plurality of different layers and/or filter media may allow a range of particle sizes to be filtered. In an embodiment, the filtration device 304 may have a filter size of less than about 1,000 microns, less than about 500 microns, less than about 400 microns, less than about 300 microns, less than about 200 microns, or less than about 100 microns. In an embodiment, the filtration device 304 may have a filter size of greater than about 5 microns, greater than about 10 microns, greater than about 20 microns, greater than about 30 microns, or greater than about 50 microns.

In an embodiment, the filter assembly 300 may optionally comprise one or more nozzles 320. The nozzles 320 may generally be disposed on the interior of the housing 302 and coupled to a source of fluid. For example, the nozzles 320 may be coupled to a source of cleaning fluid used for performing a cleaning cycle as described above. The nozzles 320 may be fixed in position or configured to move, thereby providing a multidirectional spray pattern. At least a portion of the nozzles 320 may be oriented to spray the filtration device 302 with the fluid to dislodge and wash and solids into the inlet portion 301 of the housing 302. Some nozzles may be oriented to spray the inlet portion 301 of the housing 302 to wash any solids settling to the bottom of the housing 302 into the drain 310. Various types of nozzles and any suitable number of nozzles may be used.

In some embodiment, the filter assembly 300 may optionally comprise one or more fluid outlets. Like the nozzles, the fluid outlets may generally be disposed on the interior of the housing 302 and coupled to a source of cleaning fluid. For example, the fluid outlets may be coupled to a source of cleaning fluid used for performing a cleaning cycle by allow the fluid to backwash the filter element and remove any solids into the drain. Various types of fluid outlets and any suitable number of fluid outlets may be used. In an embodiment, the filter assembly 300 may optionally comprise a release valve release valve 318. The filter assembly 300 may be designed to handle both liquids and gases. Based on the design of the filter assembly 300, gas may become trapped at the top of the filter assembly 300 during use, thereby excluding liquid from the top of the filter assembly 300. The gas may also prevent liquid from filling the filter assembly 300 prior to the pump being actuated. The release valve release valve 318 may serve to release the gas during use to allow the fluid to fill the housing 302. The release valve release valve 318 may therefore be in fluid communication with the top of the housing 302. In an embodiment, the release valve release valve 318 may comprise a one-way valve configured to release gas from within the housing 302 while preventing gas from entering the housing 302 during operation of the system. Suitable release valve 318 may comprise check valves, poppet valves, manual valves, or the like. In some embodiments, the release valve 318 may comprise an actuable valve providing fluid communication therethrough. In this embodiment, fluid may flow through the release valve 318 in a direction corresponding to an appropriate pressure differential across the release valve 318. For example, the release valve 318 may release gas from the interior to an exterior of the filter assembly 300 when the interior pressure exceeds the exterior pressure. Similarly, the release valve 318 may allow gas to enter the filter assembly when the interior pressure is below the exterior pressure. In some embodiments, the release valve 318 may be coupled to the control system through a communication link 319, and the release valve 318 may be actuated by the control system. The actuation of the release valve may provide for one-way (e.g., from the interior to the exterior of the filter assembly) or two-way fluid communication between the interior and exterior of the filter assembly 300. As described in more detail herein, the control system may actuate the release valve 318 to an open position to allow fluid to fill the filter assembly as part of the filtering process.

In some embodiments, the release valve release valve 318 may comprise a two-way safety valve and allow gas to enter the housing 302, for example, during a low pressure condition to prevent the housing 302 from collapsing. In an embodiment, a fluid line may couple the release valve release valve 318 to the solids collection vessel 240 to recapture any gases and/or fluids passing through the release valve. In some embodiments, the release valve release valve 318 may provide fluid communication to the surrounding atmosphere. In some embodiments, a secondary safety valve 311 may be disposed in the filter assembly 300 to provide a mechanical safety valve as a back-up for the release valve 318. The secondary safety valve 311 may be a one-way or two-way valve. In some embodiments, the secondary safety valve 311 may be used as a pressure safety during a low pressure condition to allow air into the housing and prevent the housing 302 from collapsing when the pressure within the housing is below a threshold. The secondary safety valve 311 may be in signal communication with the control system to provide an indication in the event that the secondary safety valve 311 is actuated, which may indicate that a low pressure condition exists within the filter assembly.

In an embodiment, the filter assembly 300 may optionally comprise one or more pressure sensors 320, 322. The pressure sensors may serve to detect a pressure in the inlet portion 301 and/or the outlet portion 303 of the housing 302. The pressure sensors 320, 322 may be coupled to a control system (e.g., control system 210 as described with respect to FIG. 2) using communication links 324, 326, respectively, to provide an input for use in determining the operating conditions and/or initiating a cleaning cycle. The communication links 324, 426 may comprise any of the types of communication links described with respect to FIG. 2. The pressure sensors may comprise any pressure sensors suitable for determining fluid pressure. The use of at least one pressure sensor on each side of the filtration device 304 may allow the fluid pressure differential across the filtration device 304 to be determined. In an embodiment, the fluid pressure differential across the filtration device 304 may be used to determine when a cleaning cycle is needed for the filter assembly 300. In some embodiments, the pressure sensors may not be present within the filter assembly 300. In this event, the inlet pressure sensor and the outlet pressure sensor as described with respect to FIG. 2 may be used to determine the pressure differential across the filter element within the filter assembly 300.

The filter assembly 300 may comprise one or more internal level sensors to determine the fluid level within one or more portions of the filter assembly 300. Any suitable type of level sensor may be used to determine the fluid or liquid level within the filter assembly 300 including, but not limited to, float sensors (e.g., magnetic float sensors, mechanical float sensors, etc.), pneumatic level sensors, conductive level sensors, ultrasonic level sensors, magnetostrictive level sensors, magnetoresistive level sensors, and the like. The level sensors may provide single point monitoring, multipoint monitoring, and/or continuous monitoring. Point monitoring refers to the sensor providing an indication about whether the level of the fluid is above or below a certain point. Mechanical float sensors can provide monitoring over multiple points, and various other types of sensors can provide continuous monitoring over a given range. When point monitoring or multipoint monitoring type sensors are used, a plurality of level sensors can be included to provide monitoring over a desired plurality of points.

The level sensors may be used to determine the fluid level within the inlet portion and/or the outlet portion. In an embodiment, a level sensor may be disposed within the outlet portion of the filter assembly 300 downstream of the filter element. One or more fluid level sensors may be disposed in the outlet portion to provide at least an upper level indication and a lower level indication. In an embodiment, an upper level sensor 256 may be used to provide the upper level indication, and a lower level sensor 258 may be used to provide the lower level indication. The upper level fluid indication may indicate that the liquid level within the outlet portion of the filter assembly 300 is at a point above a centerline (e.g., a 50% full line) of the outlet portion of the filter assembly 300. For example, the upper level fluid indication may indicated that the liquid level within the outlet portion of filter assembly 102 is at least about 60%, at least about 65%, at least about 70%, at least about 75%, at least about 80%, at least about 85%, at least about 90%, or at least about 95% of the fluid capacity of the outlet portion of the filter assembly 300. The lower level fluid indication may indicate that the liquid level within the outlet portion of the filter assembly 300 is at a point below a centerline (e.g., a 50% full line) of the outlet portion of the filter assembly 300. For example, the lower level fluid indication may indicated that the liquid level within the outlet portion of filter assembly 102 is less than about 40%, less than about 35%, less than about 30%, less than about 25%, less than about 20%, less than about 15%, or less than about 10% of the fluid capacity of the outlet portion of the filter assembly 300.

In some embodiments, a filtration device position sensor 328 may be used to detect when the filtration device 304 is disposed in the housing 302. A variety of sensors may be used as positioning sensors 328. The positioning sensor 328 may be coupled to a control system (e.g., control system 210 as described with respect to FIG. 2) using a communication link 330. The positioning sensor 328 may be used to provide an interlock for the operation of the fluid injection system, such as described above with respect to FIG. 2. In general, the system may be used to prevent the filter assembly 300 from being bypassed and allowing fluid containing solids above a certain size and/or concentration from reaching the injection well. In order to prevent a user from removing the filtration device 304 and operating the system, the positioning sensor 328 may be used to ensure that the filtration device 304 is in position before allowing the system to operate. The positioning sensor 328 may also detect when a filtration device 304 is improperly positioned within the housing 304. In either case, the position of the filtration device 304 can be communicated to the control system to indicate that the system should not operate until the filtration device 304 is properly positioned.

Referring to FIGS. 2 and 4, the control system 212 may be configured to detect the position of the filtration device 304 within the filter assembly 300 before taking any actions (e.g., in response to any other inputs). When an input is received at the input device 218, the control system may receive the position of the filtration device from the positioning sensor 328 over the communication link 330. If the filtration device is properly positioned, the system may operate as described above. When the filtration device 304 is not properly positioned, the system may simply not initiate any other actions. In some embodiments, a message may be provided to the user indicating that the filtration device 304 should be repositioned or replaced. Once the filtration device is properly positioned, the fluid injection system 200 can then be operated normally. In addition to preventing any use of the system 200, the control system may send a message to an external server indicating that the filtration device 304 is not properly positioned to allow for a technician to be dispatched to repair and/or replace the filtration device 304.

In use, the filter assembly 300 may operate by receiving a fluid in the housing 302 through the fluid inlet 306. The fluid may enter the inlet portion 301 of the housing and pass through the filtration device 304. As the fluid passes through the filtration device 304, at least a portion of any solids in the fluid may be separated from the fluid and be retained in the inlet portion 301 of the housing 302. The fluid may then pass into the outlet portion 303 of the housing 302 before passing through the fluid outlet 308 to leave the filter assembly 300. The separated solids may collect in the inlet portion 301 of the housing 302. The solids may be passed through the drain 310 by opening the drain 310 and allowing the solids to pass out of the drain 310, for example during a cleaning cycle. Some amount of fluid may pass through the drain 310 with the fluid in order to wash the separated solids down the drain 310. Once the drain 310 is closed, the filter assembly 300 may be ready to resume filtering fluid through the filtration device 304.

As described above, a cleaning cycle may be used to clean the filtration device 304 and remove the separated solids from the filter assembly 300. During a cleaning cycle, the optional nozzles 316 may be supplied with fluid such as the cleaning fluid. The fluid may pass out of the nozzles 316 and impact the filtration device 304. The fluid may generally pass from the outlet portion 303 of the housing 302 to the inlet portion 301 of the housing 302. The backwashing of the filtration device 304 may then wash and flow any removed solids from the filtration device 304 back into the inlet portion 301. The orientation of the filtration device 304 within the housing 302 may aid in allowing the solids to be washed from the filtration device 304 and collect at the bottom of the housing 302.

Once the solids are washed into the inlet portion 301, the flow of the fluid through the filtration device 304 may carry the solids into the drain 310, which may be coupled to a solids collection vessel. In some embodiments, one or more nozzles 316 may be configured to spray the housing 302 and wash any solids from one or more surfaces of the housing 302. For example, one or more nozzles 316 may be used to wash the bottom of the housing 302 by directing a fluid towards the drain 310. Any solids settling out of the fluid and resting on the bottom of the housing 302 can then be washed into the drain 310 by the fluid.

Referring to FIGS. 2-4, the systems described herein may be used to carry out a filtration process for a fluid to be injected into an injection well. The filtration process may begin with a receipt of the fluid to be filtered. The fluid may be received from a vessel, pipeline, and/or any other fluid source. In an embodiment, the fluid may be received in a vessel 104 (e.g., a vessel 104 associated with a vehicle). The vessel may be coupled to the system using one or more fluid conduits (e.g., fluid conduits 110). The conduits can be supplied with the vehicle, or in an embodiment, the conduits can be supplied by the operator of the facility. Once connected to the system 200, a valve associated with the vessel 104 may be opened to provide fluid communication between the fluid within the vessel 104 and the system 200. In some embodiments, a vent associated with a vessel 104 in which the fluid is contained may be opened. The vent may allow air to enter the vessel 104 and provide a suction break to allow the fluid to flow into the system 200 and apply a pressure (e.g., a hydrostatic pressure) to the system 200. In an embodiment, the system may be initiated based on the opening of the vent to apply a hydrostatic pressure on the system 200.

The actuation valve 202 into the system 200 may remain in a closed position while the vessel 104 or other fluid source is connected to the filtration device 102. Upon establishing fluid communication with the system 200, the fluid may exert a hydrostatic pressure on the system. The inlet pressure sensor 250 may detect the hydrostatic pressure and communicate the pressure to the control system 210. The control system 210 (e.g., using a control program) may ensure that the detected pressure is within an acceptable range. A pressure below a lower pressure threshold may not register as having any fluid in fluid communication with the system 200. A pressure above an upper pressure threshold may indicate that the vessel 104 is pressurized or that the fluid is being pressurized or forced (e.g., pumped, etc.) into the system 200. In this case, the system 200 may display a warning or otherwise remain closed to avoid the pressure causing any damage to the filter element 304 within the filtration device 102.

When the control system 210 determines that the inlet pressure is within an acceptable range, the actuator valve 202 may be opened to allow fluid into the filter assembly 102. The actuator valve 202 may be disposed upstream or downstream of the filter assembly 102. When the actuator valve 202 is disposed downstream of the filter assembly 102, the actuator valve 202 may still be opened to release a fluid lock in the system 200 and allow the fluid to enter the filter assembly 102. The release valve 318 in the filter assembly 102 may also be opened. Any air or vapor within the filter assembly 102 may prevent fluid from filling the filter assembly 102. The release valve 318 may provide fluid communication between the interior and exterior of the filter assembly 102 to allow the air or vapor to pass out of the filter assembly 102 and allow fluid to enter the filter assembly 102. The pump 206 may remain off as the fluid fills the filter assembly 102. This may allow the fluid to enter the filter assembly 102, but not freely flow through the system.

As the fluid enters the filter assembly 102, the lower level sensor 258 may be triggered when the fluid level exceeds a lower level threshold. The lower level sensor 258 may then provide a lower level indication to the control system 210. As the fluid level continues to rise, the fluid level may exceed an upper level threshold and trigger the upper level sensor 256. The upper level sensor 256 may then provide an upper level indication to the control system 210. When the upper level indication is received, the control system 210 may actuate the release valve 318 to a closed position to prevent fluid from passing through the release valve 318 to the exterior of the filter assembly 102. The control system 210 may be ready to filter the fluid (e.g., be in a ready condition) when the upper level indication is received.

Once the fluid is provided to the system, the control system 210 may utilize an input to actuate the filtration process. As described above, the control program may detect an input on the input device 218. In an embodiment, the input may comprise an identification including any of those identifications described herein. The identification may be transmitted to the control system 210 over the communication link 220. The control program may then be configured to verify an authorization of the user (e.g., the driver) to use the fluid injection system 200 based on the input from the input device 218. The control program may compare the received input with a database of authorized users, and upon verifying a match, may authenticate the user for use of the fluid injection system 200. One or more additional inputs may be received on the input device 218 or on another suitable device in signal communication with the control system 210. In an embodiment, additional inputs can include a fluid origin location (e.g., a wellsite designation, state, address, etc.), a type of fluid being provided (e.g., flowback fluid, produced fluid, wastewater, etc.), any information associated with billing (e.g., a company identification, truck number, truck type, etc.), and the like. The control system 210 may verify that any additional information is acceptable prior to initiating the filtration process.

Upon verifying and/or authenticating the user for access to the fluid injection system 200 and/or receiving any additional information, the control program may direct the control system 210 to allow fluid flow through the filter assembly 102 based on the verifying and/or authentication. In general, the user may couple the vessel 104 to the system before and/or after the user provides the input to the input device 218. Prior to activation, the vessel 104 is in fluid communication with the fluid injection system 200 including the filter assembly 102. In order to provide the fluid flow, the pump 206 can be actuated to an on position (e.g., turned on) to draw fluid through the filter assembly 102. By linking the control system 210 to the actuator valve 202 and/or the pump 206, the system 200 helps prevent a pump associated with the vehicle or the vessel 104 from being used to pump through the fluid injection system 200 in an unauthorized manner.

The control program may then direct the fluid injection system 200 to operate and allow the fluid to be filtered through the filter assembly 102. Once the actuator valve 218 and the pump 202 are actuated, the fluid may be received from the vessel 104 into the filter assembly 102. The fluid can comprise suspended solids, at least a portion of which can be separated in the filter assembly 102. The fluid passing through the filter assembly 102 may be passed through the pump to the downstream separation unit 112 where a portion of the fluid can be injected into the injection well 106. The use of the pump 206 downstream of the filter assembly 102 may cause the fluid to be drawn into the filter assembly 102. The filter assembly 102 may then operate at a pressure less than atmospheric pressure. For example, the outlet portion of the filter assembly 102 may operate at a pressure less than atmospheric pressure.

During the filtration process, one or more of the sensors may be used to monitor various aspects of the filtration process. The sensor information may be used to determine when a cleaning cycle should be performed, when a fluid supply rate changes, when actions should be taken based on various safety conditions, and when the filtration process should end.

In an embodiment, the one or more of the sensor inputs can be used to determine when a cleaning cycle should be performed. When the cleaning cycle is triggered, the control system 210 may perform the cleaning cycle as described above. The cleaning cycle can generally be performed when the filter element 304 within the filter assembly becomes clogged. As the filter element 304 becomes clogged, the pressure drop across the filter element 304 may increase. As the pump 206 continues to pull fluid from the outlet portion of the filter assembly, the fluid level in the outlet portion 303 may be lower than the fluid level in the inlet portion 301 of the filter assembly. The varying fluid levels may be determined by one or more of the pressure sensors 250, 252, one or more of the level sensors 256, 258, and/or the flow meter 254. As the fluid level in the outlet portion 303 of the filter assembly lowers, the upper level sensor 256 may provide an indication when the fluid level drops below the upper level threshold. As the fluid level continues to drop within the outlet portion 303 of the filter assembly, the lower level sensor 258 may provide a low level indication that the fluid level has fallen below the lower level threshold. The low level indication provided by the lower level sensor 258 may indicate that a level differential exists across the filter element 304. The low level indication may be used to trigger a cleaning cycle.

Additional sensor information may also be used to trigger a cleaning cycle. For example, a low level indication alone may indicate that fluid is no longer being supplied to the system 200. The inlet pressure sensor 250 may provide an input to indicate of the hydrostatic head supplied to the system 200. When the hydrostatic pressure as detected at the inlet pressure sensor 250 drops below a lower pressure threshold, the control system 210 may determine that no fluid, or an insufficient amount of fluid, is being supplied to the system 200. In this event, the low level indication may not trigger a cleaning cycle. When the hydrostatic pressure as detected at the inlet pressure sensor 250 is within a suitable operating range, the control system 210 may determine that fluid is being supplied to the system 200. In this event, the low level indication may indicate that the filter element 304 is clogged and a cleaning cycle should be performed.

In some embodiments, the fluid flow rate may be used to trigger a cleaning cycle. For example, the fluid flow rate as measured by the flow meter 254 may detect when fluid is still flowing through the system 200. When the flow meter 254 detects a flow rate, the control system 210 may determine that fluid is still passing through the system 200. In this event, the low level indication provided by the lower level sensor 258 may indicate that a cleaning cycle should be performed. When the flow meter 254 does not detect a fluid flow rate, or the fluid flow rate is below a low flow threshold, the control system 210 may determine that the fluid is not flowing through the system. In this event, a cleaning cycle may not be performed. The fluid flow rate measured by the flow meter 254 may be used alone or in combination with the level sensors and/or the pressure sensors to determine when a cleaning cycle should be performed.

In some embodiments, the outlet pressure may be used to trigger a cleaning cycle by itself or in combination with any of the other sensor readings. The outlet pressure sensor 252 may provide an indication of the pressure within the outlet portion 303 of the filter assembly. When the outlet pressure drops below a threshold, which may be below atmospheric pressure, the control system 210 may determine that a pressure differential exists across the filter element 304 within the filter assembly. The inlet pressure sensor 250 reading may be used to assist in determining a pressure differential across the filter element 304. The low pressure condition within the filter assembly may indicate that the filter is clogged and a cleaning cycle should be performed. Additional determinations, for example the inlet hydrostatic pressure, may be performed to verify that the fluid is available for filtration. If fluid is available for filtering, and the pressure within the outlet portion 303 of the filter assembly is below a low pressure threshold, the control system 210 may determine that a cleaning cycle should be performed.

When the cleaning cycle is triggered, the control system 210 may perform the cleaning cycle as described above. Once the cleaning cycle has been performed, the system may repeat the fluid intake process to restart the filtration process through the filter assembly. Specifically, the inlet pressure sensor 250 may be used to detect the hydrostatic pressure at the inlet. If the pressure at the inlet pressure sensor 250 is within the operating pressure range, the actuator valve 202 may open to allow fluid to enter the filter assembly. The release valve 318 in the filter assembly may open to allow fluid to fill the filter assembly. When the level sensors indicate that the fluid is above the upper level threshold, the release valve 318 may be closed, and the pump 206 may be restarted to resume the filtration process. When the filtration process is restarted, the control system 210 may not require that the identification or any other inputs be provided by a user. Rather, the pause in the filtration process for the cleaning cycle followed by the restarting of the filtration process may be automatically controlled without any input or intervention needed by the user.

The sensor information may also be used to determine when the fluid supply rate changes in the system 200. When the fluid is supplied from a vessel 104 or other fluid source, the fluid supply rate may change over time. For example, fluid supplied in a vessel 104 may have a flow rate dependent on numerous factors including the hydrostatic head. As the fluid level within the vessel falls, the hydrostatic pressure applied on the system 200 may also fall. Further, the fluid flow rate may also depend on a fluid viscosity, which may change with the fluid composition. As the fluid is transferred into the system, the fluid composition flowing through the system 200 may change. For example, the initial fluid flowing into the system may comprise an aqueous fluid layer, and the final fluid flowing out of the vessel may comprise a hydrocarbon layer that may have separated from the fluid within the vessel. The hydrocarbon fluid may have a higher viscosity than an aqueous fluid, and as a result, may have a lower flow rate through the system based on a given pressure drop. The system 200 may be configured to detect when the fluid within the vessel has been removed relative to a low flow rate resulting from a decreased fluid level within the vessel and/or a change in the fluid composition entering the system 200.

The control system may utilize one or more sensor inputs to detect a change in the fluid supply rate. In an embodiment, the inlet pressure sensor 250 may be used to detect a hydrostatic pressure being supplied to the system 200. The hydrostatic pressure may indicate an amount of fluid remaining in the vessel 104. The inlet pressure sensor 250 may detect an initial hydrostatic pressure when the vessel 104 is initially connected to the system 200, and the inlet pressure sensor 250 may track the decrease in the hydrostatic pressure as the fluid level within the vessel 104 falls. The control system 210 may determine a pressure at the inlet to the system 200 based on the communication with the inlet pressure sensor 250. As the hydrostatic pressure decreases during the filtration process, the control system 210 may anticipate and/or adjust for a reduced fluid flow rate. The fluid supply rate may also be detected based on an outlet pressure as detected by the outlet pressure sensor 252.

In an embodiment, the control system 210 may reduce the pump 206 rate to adjust for the reduced flow rate entering the system 200 based on the hydrostatic pressure measured. The pump 206 rate can be adjusted by varying the speed of the pump impeller. When the pump 206 is a screw pump, the speed of the rotation of the screw may be varied to reduce the flow rate out of the pump 206. The resulting flow rate produced by the pump 206 may be determined using the flow meter 254. The flow rate from the pump 206 may be reduced to match the expected inlet flow rate, and when the hydrostatic pressure falls below a lower threshold, the control system 210 may determine that the vessel 104 is substantially empty. When the vessel 104 is empty, the pump 206 may be turned off.

In some embodiments, the pump 206 may continue to run until a level indicator within the filter assembly indicates that the fluid level within the filter assembly is below a low level threshold. The level sensors 256, 258 may be used in combination with the inlet pressure sensor 250, outlet pressure sensor, 252, and/or flow meter 154 readings. The pump 206 speed may be adjusted by the control system 210 when the upper level sensor 256 indicates that the fluid level within the outlet portion of the filter assembly drops below the upper level threshold. The pump 206 speed may be further adjusted when the lower level sensor indicates that the fluid level within the outlet portion of the filter assembly drops below the lower level threshold, and in some embodiments, the pump may be turned off when the fluid level within the outlet portion of the filter assembly drops below the lower level threshold. By adjusting the pump 206 and other components of the system 200 to take the fluid supply rate into account, more of the fluid may be obtained from the vessel 104. This may advantageously allow more hydrocarbons to be recovered from the vessel 104.

Various safety conditions with the system 200 may be controlled by the control system 210 during the filtration process using inputs from one or more of the sensors. The control system 210 may monitor the system 200 for overpressures and/or underpressures during the filtration process. Overpressures may be an indication that the fluid supplied to the system 200 is being pressurized during the filtration process. In some cases, the pressure may initially be provided under hydrostatic pressure only. During the filtration process, a pump or other pressurization device may be actuated to increase the pressure of the fluid supplied to the system 200. If not contained, the overpressure may damage or destroy the filter element within the filter assembly.

In order to prevent the over pressurization of the filter assembly, information obtained from the inlet pressure sensor 250, the outlet pressure sensor 252, and/or the flow meter 254 may be used to detect an overpressure event. The inlet pressure sensor 250 may be monitored to detect a pressure outside of an expected operating pressure range. A pressure above an upper threshold may indicate that the fluid is being pressurized. In some embodiments, an increase in pressure during the filtration process may indicate an overpressure even if the pressure does not exceed an upper threshold. In general, the hydrostatic pressure may be expected to decrease during the filtration process as fluid is removed from the vessel 104. An increase in the hydrostatic pressure above a certain amount may indicate that the fluid is being pressurized for use with the system. The same thresholds may apply when the fluid is being supplied by a pipeline or other fluid source. If the pressure measured at the inlet is above an upper threshold, the control system 210 may close the actuator valve 202 until the pressure returns back to a value within the operating pressure range.

The control system 210 may also monitor the outlet pressure sensor 252 to determine if the pressure rises above a threshold. The filter element within the filter assembly may be configured to withstand a given pressure differential before failing. The outlet pressure sensor 252 may be used alone or in combination with the inlet pressure sensor 250 to determine when the pressure across the filter element exceeds a threshold. A pressure differential increase across the filter element may indicate that the fluid is being pressurized for delivery in to the system and/or the filter element is clogged. In order to address an overpressure event, the control system 210 may close the actuator valve 202 to prevent further fluid from entering the system or perform a cleaning cycle.

The control system 210 may also monitor the fluid flow rate through the filter assembly using, for example, the flow meter 254. During the filtration process, the flow rate through the filter assembly may be monitored by the control system 210. An increase in the flow rate over an expected amount (e.g., over an initial flow rate through a clean filter element) may be used by the control system 210 to indicate that the fluid is being supplied to the system under pressure. The system may shut off the pump 206 and/or close the actuator valve 202 to prevent fluid from being supplied to the system 200 if a pressurization event is detected.

The control system 210 may monitor the filter assembly for a low pressure condition. In general, at least a portion of the filter assembly may be at a pressure less than atmospheric when fluid is passing through the filter assembly and the pump 206 is operating. When the filter is clogged, the pressure differential across the filter element may be high enough to result in a pressure within the outlet portion of the filter assembly falling below a threshold, which may be referred to as an low pressure event. In an embodiment, the pressure within the outlet portion may be less than about −2 psig, less than about −3 psig, less than about −4 psig, less than about −5 psig, less than about −6, psig, less than about −7 psig, less than about −8 psig, less than about −9 psig, or less than about −10 psig. The control system may determine a pressure within the filter assembly and stop the system if the pressure within the filter assembly falls below the threshold. The pressure within the filter assembly may be detected using the outlet pressure sensor 252. A low pressure event may also be detected using the level sensors and/or the flow meter 254. For example, when the lower level sensor 258 indicates that the fluid level within the filter assembly is below a lower level threshold, the pressure within the filter assembly may have fallen below the lower pressure threshold. Similarly, when the flow rate through the system as measured by the flow meter 254 indicates that the flow rate has fallen below a threshold, the pressure within the filter assembly may have fallen below the lower pressure threshold.

When a low pressure event is detected, the control system 210 may turn off the pump 206 and actuate the release valve 318 to an open position. The release valve 318 may serve as a pressure relief device to allow air into the filter assembly. The air may relieve the low pressure to avoid deforming (e.g., collapsing, bending, etc.) the filter assembly. In some embodiments, a separate relief valve 311 may be used to avoid a low pressure event and/or serve as a mechanical back-up safety to avoid damaging the filter assembly. Following the pressure relief, the control system 210 may initiate a cleaning cycle and/or send a signal to an operator to inspect the system 200.

The filtration process may end based on various conditions. In an embodiment, the filtration process may end when the fluid in the vessel or other fluid source has been fully filtered. As described above, various sensor inputs may be used to determine when the fluid has from the fluid source has been exhausted or substantially exhausted. Once all of the fluid has been filtered, the control system may shut off the pump 206 and close the actuator valve 202 to close the system 200 to further fluid flow. The vent associated with the vessel 104 may be closed and the outlet valve of the vessel 104 may be closed. The hose may then be disconnected and any fluid remaining in the hose may be drained into the pad 246. The fluid entering the pad 246 may then flow to the solids collection vessel 240. The system may then be ready to receive another vessel or fluid source for filtering the fluid.

Under some conditions, the filtration process may be ended prior to all of the fluid being filtered. In an embodiment, the filtration process may end if the fluid being filtered is unsuitable. For example, a fluid having a large amount of solids such as a drilling mud may be received in the system 200. Upon filtering the fluid, the solids may damage the system or have a volume larger than the system is designed to handle. Under these conditions, the system may cease filtering the fluid and shut out any further attempts to input the fluid into the system.

The control system 210 may determine that a fluid is unsuitable in a number of ways. In an embodiment, the control system 210 may determine that a cleaning cycle should be performed within a certain time of a previous cleaning cycle. For example, if the control system 210 determines that a cleaning cycle should be performed (e.g., based on pressure, fluid level, flow rate, etc.) as described above within about one minute to about five minutes of the end of a previous cleaning cycle, the control system 210 may determine that the fluid is unsuitable for the filtration process. In some embodiments, the control system 210 may determine that a plurality of cleaning cycles are triggered within a given time period, and the control system 210 may determine that the fluid is unsuitable for the system 200 based on the plurality of cleaning cycles occurring within the time period. For example, the control system 210 may determine that three cleaning cycles should be performed within about a five to about a fifteen minute period. Other threshold may also be used for four or more cleaning cycles. When the last cleaning cycle is performed, the system may leave the actuator valve 202 closed and provide an indication that the fluid cannot be accepted into the system 200.

Figure 6:
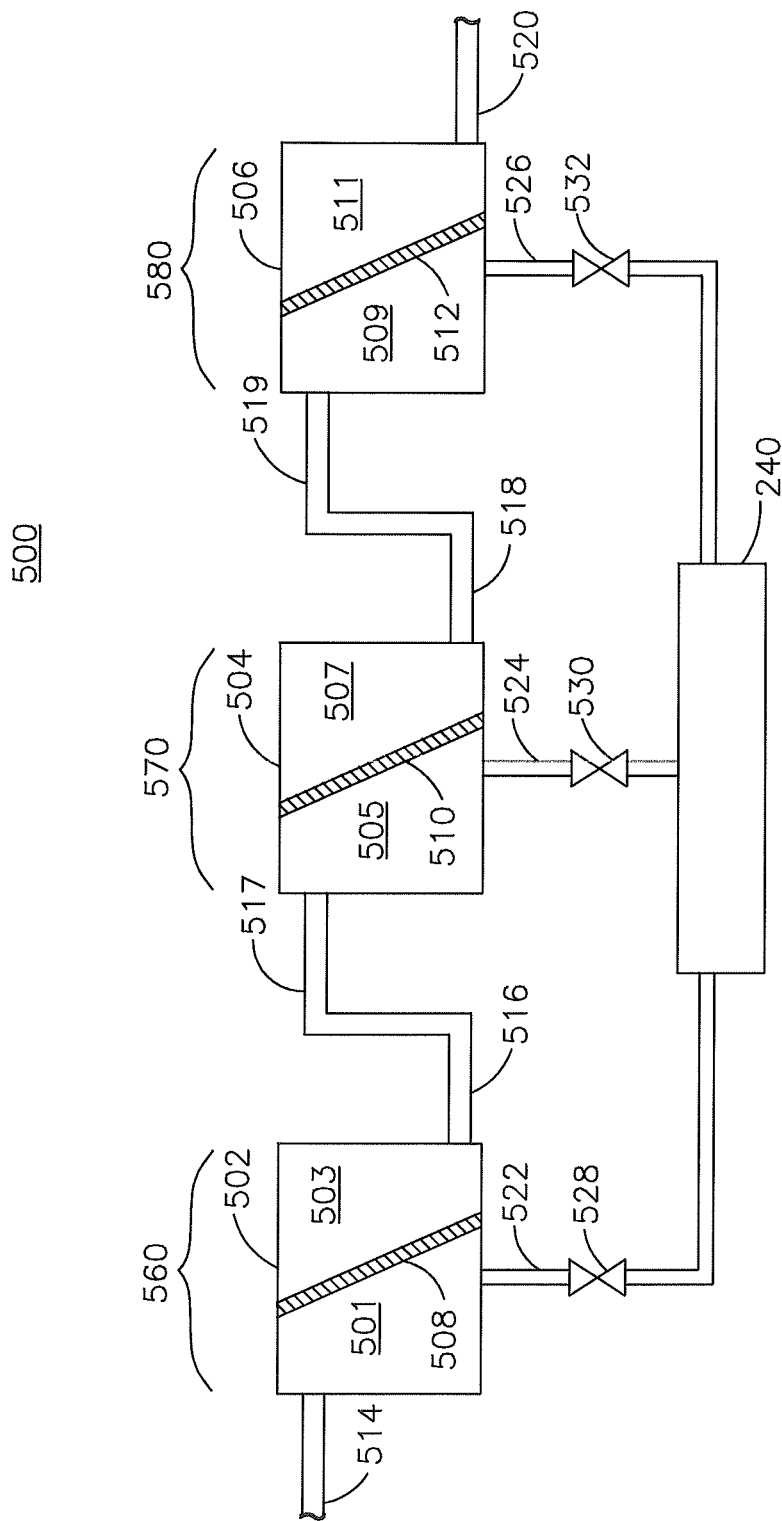
FIG. 6 illustrates a schematic cross-sectional view of still another filter assembly according to an embodiment.

While the filter assemblies 300, 400 are described with respect to FIGS. 4 and 5 as comprising a single housing 302 and filtration device 304, higher fluid volumes may be handled through the system with a greater filtering efficiency by providing a filter assembly comprising a plurality of filtration devices. In an embodiment, the plurality of filtration devices may be contained within separate filter sections disposed in series. As shown in FIG. 6, a filter assembly 500 comprises a plurality of filter sections 560, 570, 580, where the filter sections 560, 570, 580 are disposed in series. The filter assembly 500 may be similar to the filter assemblies 300, 400 described with respect to FIGS. 4 and 5, and the filter assembly 500 may also be used as the filter assembly 102 described with respect to FIG. 2.

The filter assembly 500 can comprise a plurality of filter sections 560, 570, 580. A first filter section 560 can comprise a first housing 502 comprising a first filtration device 508, a second filter section 570 can comprise a second housing 504 comprising a second filtration device 510, and a third filter section 580 can comprise a third housing 506 comprising a third filtration device 512. Each housing 502, 504, 506 is divided into a corresponding inlet portion 501, 505, and 509, respectively, and a corresponding outlet portion 503, 507, and 511, respectively. The filter sections 560, 570, 580 and corresponding housings 502, 504, and 506 are disposed in series, with the first fluid inlet 514 disposed in the first housing 502 and configured to receive a fluid into the first inlet portion 501 of the first housing 502. A first fluid outlet 516 is disposed in the first housing and is configured to pass a fluid out of the first outlet portion 503 of the first housing 502. The first fluid outlet 516 is coupled to a second fluid inlet 517 disposed in the second housing 504 and configured to receive a fluid into the second inlet portion 505 of the second housing 504. A second fluid outlet 518 is disposed in the second housing 504 and is configured to pass a fluid out of the second outlet portion 507 of the second housing 504. The second fluid outlet 518 is coupled to a third fluid inlet 519 disposed in the third housing 506 and configured to receive a fluid into the third inlet portion 509 of the third housing 506. A third fluid outlet 520 is disposed in the third housing 506 and is configured to pass a fluid out of the third outlet portion 511 of the third housing 506. Each housing 502, 504, 506 comprises a drain 522, 524, 526, respectively, that is coupled through a drain valve 528, 530, 532, respectively, to the solids collection vessel 240. While three filter sections 560, 570, 580 are shown in FIG. 6, any number of filter sections may be used with the filter assembly 500. For example, two filter sections may be used, or alternatively, four or more filter sections may be used.

The plurality of filtration devices 508, 510, 512 in each corresponding filter section 560, 570, 580 may comprise a decreasing pore size as the fluid passes through the series of housings 502, 504, 506 so that each successive filtration device filters a smaller particle size. The decreasing pore sizes may allow a first portion of the solids to be filtered in the first filtration device 508, a second portion of the solids to be filtered in the second filtration device 510, and a third portion of the solids to be filtered in the third filtration device 512. Each portion may comprise a smaller average diameter. For example, the first filtration device 508 may be configured to filter particles larger than an amount between about 1,000 microns and about 500 microns, the second filtration device 510 may be configured to filter particles larger than an amount between about 500 microns and about 200 microns, and the third filtration device 508 may be configured to filter particles larger than an amount between about 200 microns and about 10 microns. These sizes are illustrative only and the decreasing pore size may vary based on the expect particle size distribution and filtering requirements for the injection well.

The separated solids may all pass through the respective drains to a single solids collection vessel. In some embodiments, separate solids collection vessels may be provided for one or more of the housings 502, 504, 506. The housings 502, 504, 506 and corresponding filtration devices 508, 510, 512 may comprise any of the components described above with respect to the filter assemblies of FIGS. 4 and 5. For example, one or more of the filter sections 560, 570, 580 and corresponding housings 502, 504, 506 may comprise the optional components such as a one or more nozzles 316, a release valve 318, and/or one or more sensors for detecting various parameters within the housing 302. When a cleaning cycle is performed for the filter assembly 500, the filter sections 560, 570, 580 may be cleaned at the same time, or less than all of the filter sections 560, 570, 580 may be cleaned. For example, if the third filter section 580 is expected to separate a lower volume of solids from the fluid, the third filter section 580 may be cleaned less often than the first filter section 560 and/or the second filter section 570. A differential cleaning cycle schedule may limit the amount of fluid collected in the solids collection vessel.

In use, the filter assembly 500 may operate as described above. In general, the fluid to be filtered for injection may pass into the first filter section 560 through the first fluid inlet 514. The fluid may pass through the first filtration device 508, and a first portion of the solids in the fluid may be separated and retained in the first inlet portion 501. The fluid may then pass out of the first fluid outlet 516 and pass to the second fluid inlet 517. The fluid may pass through the second filtration device 510, and a second portion of the solids in the fluid may be separated and retained in the second inlet portion 505. The fluid may then pass out of the second fluid outlet 518 and pass to the third fluid inlet 519. The fluid may pass through the third filtration device 512, and a third portion of the solids in the fluid may be separated and retained in the third inlet portion 509. The fluid may then pass out of the third fluid outlet 520 and pass through the various downstream components (e.g., an actuator valve, a pump, the storage section, etc.) for injection into the injection well.

When the filter assembly 500 is not being used to filter a fluid for injection into the injection well, one or more cleaning cycles may be performed to clean the separated solids from one or more of the filter sections 560, 570, 580. When a cleaning cycle is to be performed for a filter section, the corresponding drain actuator valve 528, 530, 532 can be actuated to an open position, and a cleaning fluid can be supplied to the corresponding housing 502, 504, 506. When nozzles are present within the housing, the fluid may be supplied to the nozzles to wash the solids out of the housing and into the drain 522, 524, 526. The solids may then pass to the solids collection vessel where they may collect for later removal. The corresponding drain actuator valves 528, 530, 532 can then be closed and the system returned to a neutral state. In an embodiment, all of the filter sections 560, 570, 580 can be cleaned at the same time. In some embodiments, less than all of the filter sections 560, 570, 580 are cleaned at the same time. For example, the cleaning cycle may be performed based on an input from one or more sensors, and only those filter section(s) meeting a threshold (e.g., a pressure differential threshold across a filtration device) may be cleaned.

Figure 7:
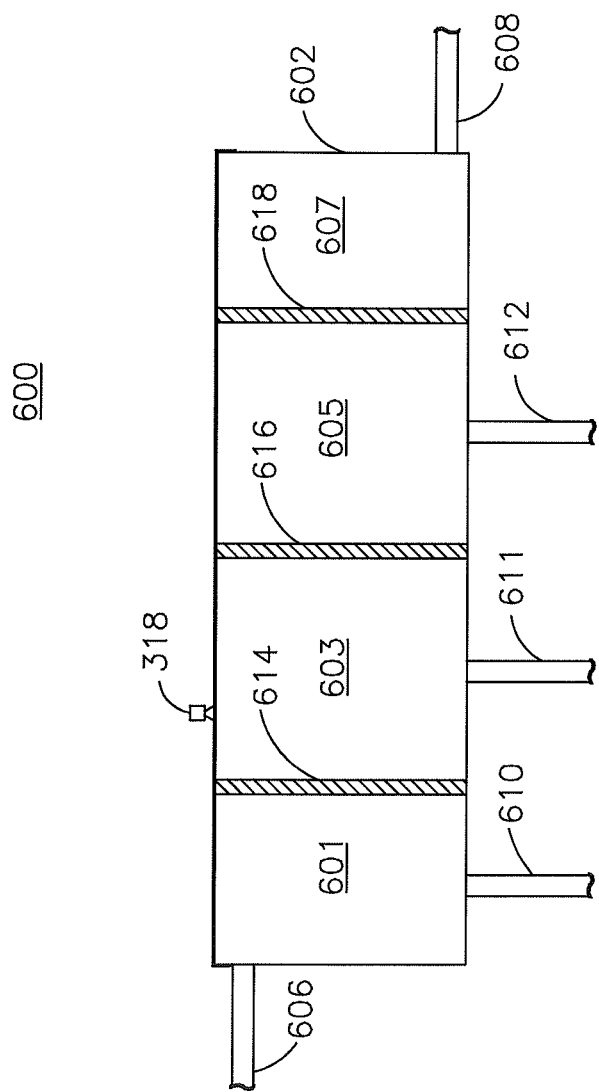
FIG. 7 illustrates a schematic cross-sectional view of yet another filter assembly according to an embodiment.
Figure 8:
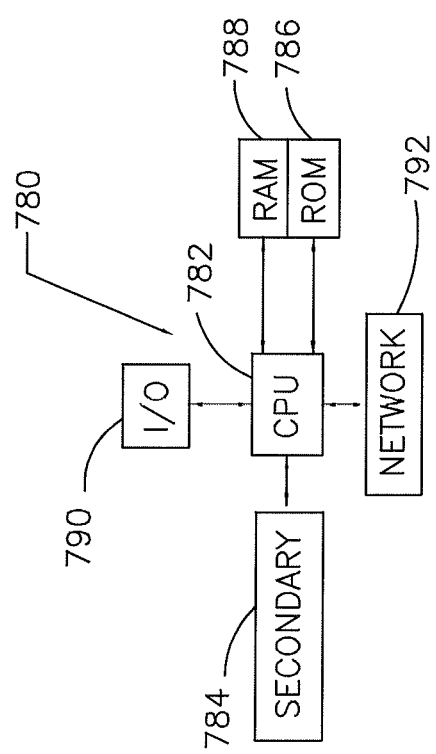
FIG. 8 illustrates a schematic layout view of computer system suitable for operating a control system according to an embodiment.

In an embodiment, the plurality of filtration devices may be contained within a single housing 302. As shown in FIG. 7, a filter assembly 600 comprises a plurality of filtration devices 614, 616, 618 disposed within a single housing 602. The filtration devices 614, 616, 618 separate the housing 602 into a plurality of sections including an inlet section 601, a second section 603, a third section 605, and an outlet section 607. The filtration devices 614, 616, 618 are disposed in series within the housing 602 such that a fluid passing through the housing 602 is forced through each filtration device 614, 616, 618 sequentially. The filtration devices 614, 616, 618, the housing 602, and the optional components (e.g., release valve 318) may be the same or similar to those elements described above with respect to FIGS. 4 and 5. In an embodiment, the filter assembly 600 may also be used as the filter assembly 102 described with respect to FIG. 2.

A fluid inlet 606 is disposed in the housing 602 and is configured to receive the fluid to be filtered into the inlet section 601. A fluid outlet is configured to pass the filtered fluid out of the housing 608 from the outlet section. Each of the inlet section, the second section 603, and the third section 605 comprise a drain 610, 611, 612, respectively, for passing the separated solids and/or a portion of fluid out of the housing 602. The drains 610, 611, 612 may provide fluid communication with a single solids collection vessel or alternatively, a plurality of solids collection vessels. While three filtration devices 614, 616, 618 are shown in FIG. 7, any number of filtration devices may be used with the filter assembly 600. For example, two filtration devices may be used, or alternatively, four or more filtration devices may be used.

The plurality of filtration devices 614, 616, 618 may comprise a decreasing pore size as the fluid passes through the series of filtration devices 614, 616, 618 within the housing 602 so that each successive filtration device filters a smaller particle size. The decreasing pore sizes may allow a first portion of the solids to be filtered in the first filtration device 614 and retained in the inlet section 601, a second portion of the solids to be filtered in the second filtration device 616 and retained in the second section 603, and a third portion of the solids to be filtered in the third filtration device 618 and retained in the third section 605. Each filtration device may comprise a smaller average filtering diameter. For example, the first filtration device 614 may be configured to filter particles larger than an amount between about 1,000 microns and about 500 microns, the second filtration device 616 may be configured to filter particles larger than an amount between about 500 microns and about 200 microns, and the third filtration device 618 may be configured to filter particles larger than an amount between about 200 microns and about 10 microns. These sizes are illustrative only and the decreasing pore size may vary based on the expect particle size distribution and filtering requirements for the injection well.

The housing 602 and corresponding filtration devices 614, 616, 618 may comprise any of the components described above with respect to the filter assemblies of FIGS. 4 and 5. For example, one or more optional components such as a one or more nozzles, a release valve 318, and/or one or more sensors for detecting various parameters within the housing 602 may be associated with one or more of the sections 601, 603, 605, 607. When a cleaning cycle is performed for the filter assembly 600, the filtration devices 614, 616, 618 may be cleaned at the same time, or less than all of the filter sections 614, 616, 618 may be cleaned. For example, if the third filtration device 618 is expected to separate a lower volume of solids from the fluid than the first filtration device 614 or the second filtration device 616, then the third filter section 580 may be cleaned less often than the filtration devices 614, 616. In an embodiment, drain actuator valves may be associated with each drain 610, 611, 612, thereby allowing for selective fluid communication from each section s601, 603, 605. Alternatively, a single drain actuator valve may be coupled to a common drain line that is coupled to each of the drain lines 610, 611, 612, and a differential cleaning cycle may be performed based on the selection of cleaning nozzles provided with cleaning fluid. A differential cleaning cycle schedule may limit the amount of fluid collected in the solids collection vessel.

In use, the filter assembly 600 may operate as described above with respect to FIGS. 4 and 5. In general, the fluid to be filtered for injection may pass into the inlet section 601 through the fluid inlet 606. The fluid may pass through the first filtration device 614, and a first portion of the solids in the fluid may be separated and retained in the inlet portion 601. The fluid may then pass into the second section 603 before passing through the second filtration device 616 where a second portion of the solids in the fluid may be separated and retained in the second portion 603. The fluid may then pass into the third section 605 before passing through the third filtration device 618 wherein a third portion of the solids in the fluid may be separated and retained in the third portion 605. The fluid may then pass into the outlet section 607 and into the fluid outlet 608. The fluid may then pass through the various downstream components (e.g., an actuator valve, a pump, the storage section, etc.) for injection into the injection well.

When the filter assembly 500 is not being used to filter a fluid for injection into the injection well, one or more cleaning cycles may be performed to clean the separated solids from one or more of the sections 601, 603, 605. When a cleaning cycle is to be performed for a section, a corresponding drain actuator valve can be actuated to an open position when a plurality of drain actuator valves are used, or a single drain actuator valve coupled to each drain 610, 611, 612 may be actuated. When nozzles are present within the housing, the fluid may be supplied to the nozzles to wash the solids out of the housing and into one or more of the drains 610, 611, 612. The solids may then pass to the solids collection vessel where they may collect for later removal. The corresponding drain actuator valves can then be closed and the system returned to a neutral state. In an embodiment, all of the filtration devices 614, 616, 618 can be cleaned at the same time. In some embodiments, less than all of the filtration devices 614, 616, 618 are cleaned at the same time. For example, the cleaning cycle may be performed based on an input from one or more sensors, and only those filter section(s) meeting a threshold (e.g., a pressure differential threshold across a filtration device) may be cleaned.

The use of the filter assembly 500 comprising a plurality of filter sections 560, 570, 580 and/or the filter assembly 600 comprising a plurality of filtration devices in a single housing may be used in any combination to provide the desired level of filtering of a fluid. The use of the filter assembly 500 and/or the filter assembly 600 may provide redundant filtering capabilities to reduce the occurrence of solids passing to the injection well. Should a single filtration device fail or become damaged or bypassed, the remaining filtration devices may remain in position to filter the fluid for injection. Further, the use of filtration devices having different mesh sizes may allow a larger volume of fluid to be filtered through the filter assembly 500.

The filter assemblies described herein may form a portion of a portable filtration device. For example, any of the filter assemblies 300, 400, 500, and/or 600 may form a portion of a portable unit with or without any other components of the fluid injection system described herein. In an embodiment, a filter assembly may be provided on a trailer or other transportation device. The filter assembly may be transported to a drilling and/or producing well site for use in filtering a produced fluid at the well site. For example, the filter assembly may be used at a drilling site to filter recovered water prior to the water being transported offsite for disposal (e.g., using a fluid injection system as described herein). The filtration device within the filter assembly may comprise a larger pore size than a stationary filter assembly, which may allow the filter assembly to serve as a pre-filter for the fluid prior to the fluid being sent for filtration through the fluid injection system. In some embodiments, the filtration device may be situated at a well site and used to filter the fluid prior to re-use and/or reinjection of the fluid into the wellbore from which the fluid was produced. For example, the filter assembly may be used to filter produced water for reinjection or provide a particle filter for a drilling mud after it has passed through the drill cutting screens (e.g., shaker screens, a settling pit, etc.). The use of the filter assemblies described herein may allow for a system to be used that is free from disposable filtration devices, thereby simplifying the system and reducing the environmental waste associated with the disposable filtration devices. Various other uses for the filter assemblies described herein where suspended solids are to be removed from a fluid are within the scope of this disclosure.

FIG. 7 illustrates a computer system 780 suitable for implementing one or more embodiments disclosed herein. For example, the control system 210 described with respect to FIG. 2 may be implemented on the computer system 780 as well as one or more components of the control program stored in the memory. The computer system 780 includes a processor 782 (e.g., such as processor 216 of FIG. 2), which may be referred to as a central processor unit or CPU, that is in communication with memory devices (e.g., memory 214 of FIG. 2) including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions (the control program described with respect to FIG. 2) onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, biometric input devices, or other well-known input devices. In an embodiment, the input device 218 of FIG. 2 may comprise any of the I/O devices 790 described herein.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 792 may enable the processor 782 to communicate with the Internet or one or more intranets. In some embodiments, the network connectivity devices 792 may enable the processor 782 to communicate with one or more of the components of the fluid injection system 200 over one or more of the communication links 220, 222, 224, 226, 244. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embedded in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer system 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

Having described the various tools, systems, and method herein, embodiments may include, but are not limited to:

In a first embodiment, a method of filtering fluid for injection into an injection well comprises detecting a fluid pressure in a conduit upstream of an actuator valve; verifying that the fluid pressure is within an operating pressure range; opening an actuator valve based on the verifying; receiving a fluid within a filter assembly in response to opening the actuator valve, wherein the fluid comprises suspended solids; actuating a pump in fluid communication with the filter assembly based on receiving the fluid within the filter assembly; and separating at least a portion of the suspended solids in the fluid within the filter assembly.

A second embodiment can include the method of the first embodiment, further comprising: detecting a fluid level within the filter assembly in response to receiving the fluid within the filter assembly; and determining that the fluid level is above a fluid level threshold.

A third embodiment can include the method of the second embodiment, wherein actuating the pump is further based on determining that the fluid level is above the fluid level threshold.

A fourth embodiment can include the method of the first embodiment, further comprising: opening a release valve in fluid communication with the filter assembly, wherein receiving the fluid within the filter assembly is further in response to opening the release valve.

A fifth embodiment can include the method of the fourth embodiment, further comprising: closing the release valve when a fluid level within the filter assembly rises above a fluid level threshold.

A sixth embodiment can include the method of the first embodiment, further comprising: opening a vessel vent in a vessel comprising the fluid; and transferring the fluid from the vessel to the conduit in response to opening the vessel vent.

A seventh embodiment can include the method of the sixth embodiment, wherein the fluid in the conduit is at a hydrostatic pressure based on the fluid in the vessel.

An eighth embodiment can include the method of the first embodiment, wherein the operating pressure range is about 0.5 psig to about 10 psig.

A ninth embodiment can include the method of the first embodiment, wherein a pressure within at least a portion of the filter assembly is below atmospheric pressure during the separating of the at least the portion of the suspended solids.

A tenth embodiment can include the method of the first embodiment, further comprising: receiving, by an input device, an input comprising an identification; and verifying an authorization to use the filter assembly in response to receiving the input, wherein actuating the pump is further based on the verifying of the authorization.

An eleventh embodiment can include the method of the first embodiment, further comprising: detecting a low pressure condition within the filter assembly, wherein the low pressure condition comprises a pressure below a low pressure threshold, wherein the low pressure threshold is below atmospheric pressure; opening a release valve in fluid communication with the filter assembly; and relieving the low pressure condition in response to opening the release valve.

A twelfth embodiment can include the method of the eleventh embodiment, wherein the release valve comprises a safety backup valve.

A thirteenth embodiment can include the method of the eleventh embodiment, further comprising turning the pump off in response to detecting the low pressure condition.

A fourteenth embodiment can include the method of the eleventh embodiment, wherein detecting the low pressure condition comprises detecting a low fluid level in an outlet portion of the filter assembly.

A fifteenth embodiment can include the method of the eleventh embodiment, wherein detecting the low pressure condition comprises detecting a low fluid flow rate through the filter assembly.

A sixteenth embodiment can include the method of the eleventh embodiment, further comprising: performing a cleaning cycle in the filter assembly in response to detecting the low pressure condition.

In a seventeenth embodiment, a fluid injection filtration system comprises: a filter assembly configured to receive a fluid comprising suspended solids and separate at least a portion of the suspended solids from the fluid, wherein the fluid comprises an aqueous fluid portion, a hydrocarbon fluid portion, and the suspended solids; an actuator valve in fluid communication with the filter assembly, wherein the actuator valve is configured to selectively control fluid flow through the filter assembly; and a pump in fluid communication with the filter assembly, wherein the pump is configured to receive the fluid comprising at least the aqueous fluid portion and the hydrocarbon fluid portion, wherein the pump is configured to avoid substantially homogenizing the fluid.

An eighteenth embodiment can include the system of the seventeenth embodiment, wherein the pump comprises a screw pump.

A nineteenth embodiment can include the system of the seventeenth embodiment, wherein the pump is configured to increase the viscosity of the fluid by less than about 50% as the fluid passes through the pump.

A twentieth embodiment can include the system of the seventeenth embodiment, further comprising a solids collection vessel, wherein the solids collection vessel is configured to receive the portion of the suspended solids separated from the fluid.

A twenty first embodiment can include the system of the seventeenth embodiment, further comprising a release valve in fluid communication with the filter assembly, wherein the release valve is configured to allow release to vent from the filter assembly when the fluid is received within the filter assembly.

A twenty second embodiment can include the system of the seventeenth embodiment, further comprising a pressure relief valve in fluid communication with the filter assembly, wherein the pressure relief valve is configured to allow air to enter the filter assembly when the pressure within the filter assembly falls below a low pressure threshold.

A twenty third embodiment can include the system of the seventeenth embodiment, wherein the filter assembly comprises a housing, and wherein the system further comprises: a drain disposed in a lower portion of the housing and configured to pass a portion of the fluid comprising at least the portion of the suspended solids out of the housing; and a solids collection vessel in fluid communication with the drain, wherein the solids collection vessel is configured to receive at least the portion of the suspended solids.

In a twenty fourth embodiment, a method of filtering fluid for injection into an injection well comprises: receiving a fluid within a filter assembly, wherein the fluid comprises an aqueous fluid, a hydrocarbon fluid, and suspended solids; passing the fluid through the filter assembly; separating at least a portion of the suspended solids in the fluid within the filter assembly as the fluid passes through the filter assembly; ceasing separation of the suspended solids from the fluid; washing at least the portion of the separated suspended solids from the filter assembly into a solids collection vessel, wherein at least a portion of the aqueous fluid and the hydrocarbon fluid pass into the solids collection vessel with the separated suspended solids; separating the aqueous fluid and the hydrocarbon fluid from the portion of the solids in the solids collection vessel; and recycling at least the hydrocarbon fluid from the solids collection vessel to an inlet of the filter assembly.

A twenty fifth embodiment can include the method of the twenty fourth embodiment, further comprising: detecting a fluid level in the filter assembly during the separating; and determining that the detected fluid level falls below a lower level threshold, wherein washing at least the portion of the separated solids from the filter assembly occurs in response to determining that the detected fluid level falls below the lower level threshold.

A twenty sixth embodiment can include the method of the twenty fourth embodiment, further comprising: detecting a fluid flow rate through the filter assembly during the separating; and determining that the fluid flow rate falls below a low flow threshold, wherein washing at least the portion of the separated solids from the filter assembly occurs in response to determining that the detected fluid flow rate falls below the low flow threshold.

A twenty seventh embodiment can include the method of the twenty fourth embodiment, wherein receiving the fluid comprises receiving the fluid from a vessel, and wherein receiving the fluid from the vessel occurs in response to a vent opening in the vessel.

A twenty eighth embodiment can include the method of the twenty fourth embodiment, wherein receiving the fluid comprises receiving the fluid under hydrostatic pressure only.

A twenty ninth embodiment can include the method of the twenty fourth embodiment, where at least a portion of the filter assembly is at a pressure below atmospheric pressure during the separating.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of filtering fluid for injection into an injection well, the method comprising:
   detecting a fluid pressure of a fluid in a conduit upstream of an actuator valve, wherein the fluid is contained in a vessel;
   verifying that the fluid pressure is within an operating pressure range;
   opening the actuator valve based on the verifying;
   receiving a fluid within a filter assembly in response to opening the actuator valve, wherein the fluid comprises suspended solids;
   opening a vessel vent in the vessel comprising the fluid;
   transferring the fluid from the vessel to the conduit in response to opening the vessel vent;
   actuating a pump in fluid communication with the filter assembly based on receiving the fluid within the filter assembly; and
   separating at least a portion of the suspended solids in the fluid within the filter assembly.

2. The method of claim 1, wherein the fluid in the conduit is at a hydrostatic pressure based on the fluid in the vessel.

3. The method of claim 1, wherein the fluid comprises an aqueous fluid, a hydrocarbon fluid, and the suspended solids.

4. The method of claim 1, wherein the pump comprises a screw pump.

5. The method of claim 1, further comprising:
   pumping the fluid out of the filter assembly during the separating of at least the portion of the suspended solids; and
   increasing a viscosity of the fluid by less than about 50% as the fluid passes through the pump.

6. The method of claim 3, further comprising:
   ceasing separation of the suspended solids from the fluid;
   washing at least the portion of the separated suspended solids from the filter assembly into a solids collection vessel, wherein at least a portion of the aqueous fluid and the hydrocarbon fluid pass into the solids collection vessel with the separated suspended solids;
   separating the aqueous fluid and the hydrocarbon fluid from the portion of the solids in the solids collection vessel; and
   recycling at least the hydrocarbon fluid from the solids collection vessel to an inlet of the filter assembly.

7. The method of claim 6, further comprising:
   detecting a fluid level in the filter assembly during the separating; and
   determining that the detected fluid level falls below a lower level threshold, wherein washing at least the portion of the separated solids from the filter assembly occurs in response to determining that the detected fluid level falls below the lower level threshold.

8. The method of claim 6, further comprising:
   detecting a fluid flow rate through the filter assembly during the separating; and
   determining that the fluid flow rate falls below a low flow threshold, wherein washing at least the portion of the separated solids from the filter assembly occurs in response to determining that the detected fluid flow rate falls below the low flow threshold.

9. The method of claim 1, wherein receiving the fluid comprises receiving the fluid under hydrostatic pressure only.

10. The method of claim 1, where at least a portion of the filter assembly is at a pressure below atmospheric pressure during the separating.

11. The method of claim 1, further comprising:
    detecting a low pressure condition within the filter assembly, wherein the low pressure condition comprises a pressure below a low pressure threshold, wherein the low pressure threshold is below atmospheric pressure;
    opening a release valve in fluid communication with the filter assembly; and
    relieving the low pressure condition in response to opening the release valve.

12. The method of claim 11, wherein the release valve comprises a safety backup valve.

13. The method of claim 11, further comprising:
turning the pump off in response to detecting the low pressure condition.

\* \* \* \* \*